United States Patent
Wang et al.

(10) Patent No.: US 10,771,104 B2
(45) Date of Patent: *Sep. 8, 2020

(54) PROCESSING DEVICE, NETWORK NODE, CLIENT DEVICE, AND METHODS THEREOF

(71) Applicant: HUAWEI TECHNOLOGIES CO., LTD., Shenzhen, Guangdong (CN)

(72) Inventors: Peng Wang, Kista (SE); Fredrik Berggren, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,911

(22) Filed: Jul. 9, 2019

(65) Prior Publication Data

US 2019/0334575 A1 Oct. 31, 2019

Related U.S. Application Data

(63) Continuation of application No. 16/235,909, filed on Dec. 28, 2018, now Pat. No. 10,404,317, which is a
(Continued)

(51) Int. Cl.
*H04B 1/7083* (2011.01)
*H04J 11/00* (2006.01)
(Continued)

(52) U.S. Cl.
CPC ......... *H04B 1/7083* (2013.01); *H04B 1/7093* (2013.01); *H04J 11/0073* (2013.01);
(Continued)

(58) Field of Classification Search
CPC ............... H04B 1/7083; H04B 1/7093; H04B 2001/70935; H04J 13/0025;
(Continued)

(56) References Cited

U.S. PATENT DOCUMENTS 8,798,218 B2 8/2014 Xia et al.
2012/0117135 A1 5/2012 Yoon
(Continued)

FOREIGN PATENT DOCUMENTS

CN 102484577 A 5/2012
CN 103188027 A 7/2013
(Continued)

OTHER PUBLICATIONS

Intel Corporation, NR PSS and SSS Design, Apr. 3-7 2017, 3GPP TSG RAN WG1 Meeting Ran 1 #88bis, R1-1706156, pp. 1-7 (Year: 2017).*
(Continued)

*Primary Examiner* — Christopher P Grey
(74) *Attorney, Agent, or Firm* — James Anderson Harrison

(57) ABSTRACT

This disclosure relates to techniques for synchronization signals. The synchronization signal comprise a primary synchronization signal (PSS) generated based on a PSS sequence and a secondary synchronization signal (SSS) generated based on an SSS sequence. The SSS sequence may be generated based on a first sequence corresponding to a first cyclic shift and a second sequence corresponding to a second cyclic shift. The first cyclic shift and the second cyclic shift are associated with Cell ID. The PSS sequence may be generated based on one of the first and the second sequences.

30 Claims, 10 Drawing Sheets

Related U.S. Application Data continuation of application No. PCT/EP2017/060707, filed on May 4, 2017.

(51) Int. Cl.
  *H04J 13/00* (2011.01)
  *H04B 1/7093* (2011.01)
  *H04L 27/26* (2006.01)
  *H04W 72/04* (2009.01)

(52) U.S. Cl.
  CPC ....... *H04J 11/0076* (2013.01); *H04J 13/0025* (2013.01); *H04J 13/0029* (2013.01); *H04L 27/2607* (2013.01); *H04W 72/0466* (2013.01); *H04B 2001/70935* (2013.01)

(58) Field of Classification Search
  CPC .............. H04J 13/0029; H04J 11/0073; H04J 11/0076; H04W 72/0466; H04L 27/2607
  See application file for complete search history.

(56) References Cited

U.S. PATENT DOCUMENTS

| | | | | |
|---|---|---|---|---|
| 2013/0016801 | A1* | 1/2013 | Xia | H04J 13/0059 375/354 |
| 2014/0313997 | A1 | 10/2014 | Xu et al. | |
| 2015/0016339 | A1* | 1/2015 | You | H04J 11/0073 370/328 |
| 2015/0311947 | A1 | 10/2015 | Lei | |
| 2017/0026965 | A1* | 1/2017 | Ode | H04B 17/309 |
| 2018/0255522 | A1* | 9/2018 | Jung | H04W 72/044 |
| 2018/0368087 | A1* | 12/2018 | Jung | H04W 56/001 |

FOREIGN PATENT DOCUMENTS

| | | |
|---|---|---|
| CN | 103428146 A | 12/2013 |
| CN | 105122705 A | 12/2015 |
| CN | 106304346 A | 1/2017 |
| CN | 105409301 B | 7/2019 |
| EP | 2456117 A2 | 5/2012 |
| EP | 2993944 A1 | 3/2016 |
| RU | 2417519 C2 | 4/2011 |
| RU | 2434346 C2 | 11/2011 |
| RU | 2437210 C2 | 12/2011 |
| WO | 2012073131 A1 | 6/2012 |
| WO | 2018128867 A1 | 7/2018 |
| WO | 2018164414 A1 | 9/2018 |

OTHER PUBLICATIONS

Nokia, Alcatel-Lucent Shanhai Bell, Synchronization Singal Design and Performance Analysis, Apr. 2-7 2017, 3GPP TSG-RAN WG1 Meeting #88bis, R1-1706189, pp. 8-10 (Year: 2017).*

3GPP TS 38.300 V0.2.0 (May 2017);3rd Generation Partnership Project;Technical Specification Group Radio Access Network;NG Radio Access Network;Overall Description;Stage 2(Release 15);total 33 pages.

3GPP TS 38.331 V0.0.2 (Mar. 2017);3rd Generation Partnership Project;Technical Specification Group Radio Access Network;NR;Radio Resource Control (RRC);Protocol specification(Release 15);total 13 pages.

3GPP TS 36.213 V14.2.0 (Mar. 2017);3rd Generation Partnership Project;Technical Specification Group Radio Access Network;Evolved Universal Terrestrial Radio Access (E-UTRA);Physical layer procedures(Release 14);total 454 pages.

R1-1706156,Intel Corporation:"NR PSS and SSS Design", 3GPP TSG RAN WG1 Meeting RAN1#88bis, Spokane, WA, U.S.A. Apr. 3-7, 2017. XP51252459A. 27 pages.

R1-1706189,Nokia et al"Synchronization Signal Design and Performance Analysis", 3GPP TSG-RAN WG1 Meeting #88bis, Spokane, WA, USA Apr. 3-7, 2017. XP51252469A. 9 pages.

R1-1704452,MediaTek Inc. : "On Synchronization Signal Bandwidth and Sequence Design", 3GPP TSG RAN WG1 Meeting #88b, Spokane, Washington, USA, Apr. 3-7, 2017. XP51242597A. 12 pages.

R1-1705564, Qualcomm Incorporated, "Synchronization signal bandwidth and sequence design," 3GPP TSG-RAN WG1 #88bis, Spokane, USA, Apr. 3-7, 2017. 16 pages.

R1-1704707, Intel Corporation, "NR PSS and SSS design," 3GPP TSG RAN WG1 Meeting RAN1 #88bis, Spokane, USA, Apr. 3-7, 2017. 23 pages.

R1-1705317, Samsung, "SS bandwidth and sequence design," 3GPP TSG RAN WG1 Meeting #88bis, Spokane, USA, Apr. 3-7, 2017. 12 pages.

R1-1704864, LG Electronics, "Summary of 88-12 email discussion on NR-SS design," 3GPP TSG RAN WG1 Meeting #88bis, Spokane, USA, Apr. 3-7, 2017. 3 pages.

3GPP TS 36.211 V14.0.0 (Sep. 2016),3rd Generation Partnership Project;Technical Specification Group Radio Access Network;Evolved Universal Terrestrial Radio Access (E-UTRA);Physical channels and modulation(Release 14),total 170 pages.

R1-1611267, ZTE Corporation:"Issues Related to NR-SS", 3GPP TSG RAN WG1 Meeting #87 , Reno, USA, Nov. 14-18, 2016.8 pages.

3GPP TSG RAN WG1 Meeting #86bis, RAN1 Chairman's Notes, Lisbon, Portugal Oct. 10-14, 2016. 113 pages.

* cited by examiner

PROCESSING DEVICE, NETWORK NODE, CLIENT DEVICE, AND METHODS THEREOF

CROSS-REFERENCE TO RELATED APPLICATIONS

This application is a continuation of U.S. patent application Ser. No. 16/235,909, filed on Dec. 28, 2018, which is a continuation of an International Application No. PCT/EP2017/060707, filed on May 4, 2017, All of the aforementioned patent applications are hereby incorporated by reference in their entireties.

TECHNICAL FIELD

The invention relates to a processing device, as well as a network node and a client device comprising such a processing device. Furthermore, the invention also relates to corresponding methods and a computer program.

BACKGROUND

Synchronization is fundamental in most telecommunication systems, e.g. telecommunication systems based on long term evolution (LTE) or LTE-Advanced. To allow client devices to perform synchronization with the network, at least one transmit-receive point (TRP) in each cell of the network transmits periodic synchronization signals. These synchronization signals are detected by the client devices located nearby and used by each client device to identify a proper cell as its serving cell. Hence synchronization allows the client device to acquire a connection to a TRP and track the connection between them for subsequent data communications.

In LTE cellular systems, the synchronization signal comprises a primary synchronization signal (PSS) and a secondary synchronization signal (SSS). PSS and SSS are each transmitted on a unique orthogonal frequency division multiplexing (OFDM) symbol within each periodicity, i.e. within each 5 ms. There are 3 PSSs and 168 SSSs, jointly used to carry 3×168=504 cell identities (IDs). The 168 SSSs are further scrambled by the PSS sequence index, and also scrambled to indicate the first and second half frame timing. Different PSS and SSS sequence pairs carry different cell IDs and are transmitted by TRP(s) in different cells. The client device first acquires coarse time and frequency synchronization as well as an index carried in PSS, $N_{ID}^{(2)} \in \{0, 1, 2\}$, by detecting PSS in the time domain. The client device then acquires an index carried in SSS, $N_{ID}^{(1)} \in \{0, 1, 2, \ldots, 167\}$, by detecting SSS in the frequency domain. The cell ID is then given by $N_{ID} = 3 N_{ID}^{(1)} + N_{ID}^{(2)}$. Specifically, the PSS sequences are constructed based on a length-63 Zadoff Chu (ZC) sequence with three different root indices, and the SSS sequences are constructed by the interleaved concatenation of two length-31 m-sequences with different cyclic shifts, $m_0$ and $m_1$. These two short m-sequences are further scrambled based on $N_{ID}^{(2)}$, i.e. there are 168 SSS sequences associated with each PSS sequence, and the second m-sequence is scrambled based on the cyclic shift of the first m-sequence. The cell ID $N_{ID}$ is encoded in the SSS sequences via a unique and reversible mapping between the indices $N_{ID}^{(1)}$ and $N_{ID}^{(2)}$ and the cyclic shifts $m_0$ and $m_1$.

The 3rd generation partnership project (3GPP) is currently working on defining a New Radio (NR) access technology. It has been agreed that synchronization in NR should use 3 NR PSS sequences based on a pure binary phase-shift keying (BPSK) modulated m-sequence with 3 different cyclic shifts. In addition, the number of NR SSSs should be about 1000 after scrambling, i.e. each PSS sequence should correspond to around 333 SSS sequences. Hence, with the 3 NR PSSs around 3×333≈1000 cell IDs can be provided, which is approximately two times the number of cell IDs provided in LTE.

The current LTE SSS design, which concatenates two short m-sequences, suffers from a high risk of cross-correlation as there exist many SSS sequence pairs for which one of the two short m-sequences has the same cyclic shift. This high risk for cross-correlation may cause a high probability of incorrect cell ID detection, especially during hand-over procedure.

SUMMARY

An objective of embodiments of the invention is to provide a solution which mitigates or solves the drawbacks and problems of conventional solutions.

The above and further objectives are solved by the subject matter of the independent claims. Further advantageous implementation forms of the present invention can be found in the dependent claims.

According to a first aspect of the invention, the above mentioned and other objectives are achieved with a processing device for generating a secondary synchronization signal sequence to be utilized together with a primary synchronization signal sequence for synchronization, the processing device being configured to:

determine a first cyclic shift $m_0$ and a second cyclic shift $m_1$ based at least on a cell ID $N_{ID}$, wherein at least one of the first cyclic shift $m_0$ and the second cyclic shift $m_1$ is associated with the primary synchronization signal sequence by being determined based also on an index $N_{ID}^{(2)}$ of the primary synchronization signal sequence; and generate the secondary synchronization signal sequence based on a modulo-2 summation of a first binary sequence cyclically shifted by a first cyclic shift $m_0$ and a second binary sequence cyclically shifted by a second cyclic shift $m_1$, such that if two generated secondary synchronization signal sequences associated with a primary synchronization signal sequence are cyclically shifted versions of each other, the two generated secondary synchronization signal sequences are non-consecutively shifted versions of each other.

Thus, two generated secondary synchronization signal sequences associated with a primary synchronization signal sequence that are cyclically shifted versions of each other should not be consecutively shifted versions of each other. In other words, a first generated secondary synchronization signal sequence and a second generated secondary synchronization signal sequence that are both associated with one and the same primary synchronization signal sequence, and where the first generated secondary synchronization signal sequence may be reached by cyclically shifting the second generated secondary synchronization signal sequence and/or where the second generated secondary synchronization signal sequence may be reached by cyclically shifting the first generated secondary synchronization signal sequence, are only allowed if the first and the second generated secondary synchronization signal sequences are non-consecutively shifted versions of each other, i.e. the first generated secondary synchronization signal sequence may only be reached by cyclically shifting the second generated secondary synchronization signal sequence by two or more steps and/or the second generated secondary synchronization signal sequence may only be reached by cyclically shifting the first generated secondary synchronization signal sequence by two or more steps.

A processing device according to the first aspect provides a number of advantages over conventional solutions. An advantage of the processing device is that the secondary synchronization signal SSS sequences are generated in a simple and efficient way, such that a low complexity and efficient encoding of the cell IDs is provided.

A low cross-correlation between the secondary synchronization signal SSS sequences considering frequency offsets is provided by the generation of the secondary synchronization signal SSS sequences, which improves the reliability of the secondary synchronization signal SSS sequences detection in a client device, and consequently reduces the cell search time.

Also, closed-form encoding and decoding mapping functions for efficiently, and with low complexity, obtaining the sequence indices from the cell ID, and vice versa, are made possible by the generation and use of the secondary synchronization signal SSS sequences. This reduces the complexity of the network node and of a client device, and provides a quick and efficient method for determining the cell ID. At the client device, a descrambled received signal can be efficiently detected, e.g. by utilizing the fast Walsh-Hadamard transform (FWHT).

Thus, the herein described embodiments enable an efficient encoding of the cell ID to the secondary synchronization SSS sequence, which guarantees a low cross-correlation between SSS sequences even under large residual frequency offset, and at the same time allows a simple mapping from the cell ID to first and second cyclic shift values, and vice versa.

In an implementation form of a processing device according to the first aspect, the first and second binary sequences are one in the group of:
  m-sequences; and
  m-sequences resulting in that the generated secondary synchronization signal sequences belong to one set of Gold sequences.

An advantage with this implementation form is that, when the first and second binary sequences utilized for generating the secondary synchronization signal SSS sequences are m-sequences, and especially if they are m-sequences resulting in generated secondary synchronization signal SSS sequences belonging to one set of Gold sequences, low cross-correlation between the generated SSS sequences is guaranteed.

In an implementation form of a processing device according to the first aspect, one of the first and second binary sequences utilized for generating the secondary synchronization signal SSS sequences is the same binary sequence, e.g. the same pseudorandom maximum length sequence, which is used to generate the one or more primary synchronization signal PSS sequences.

In an implementation form of a processing device according to the first aspect, a number of primary synchronization signal sequences usable for synchronization is one in the group of:
  one primary synchronization signal sequence;
  two or more primary synchronization signal sequences; and
  three primary synchronization signal sequences.

An advantage with this implementation form is that a flexible generation of synchronization signals, adaptable for a large number of cell IDs, is provided. The use of one primary synchronization signal PSS sequence enables a lower complexity in the primary synchronization signal detection. The use of two or more, e.g. three, primary synchronization signal PSS sequences enables the association of a sub-set of the secondary synchronization signal SSS sequences with each primary synchronization signal PSS sequence. Hereby, only a sub-set of the secondary synchronization signal SSS sequences need to be detected after a successful primary synchronization signal detection, by which a lower complexity in the secondary synchronization signal SSS detection is achieved. Hence, this implementation form is advantageous since it offers a trade-off between the detection complexities of primary synchronization signals and secondary synchronization signals.

In an implementation form of a processing device according to the first aspect, the generated secondary synchronization signal sequence has a length L of 127; L=127.

An advantage with this implementation form is that the generation of secondary synchronization signal (SSS) may be used for a number of available and coming wireless systems.

In an implementation form of a processing device according to the first aspect, the processing device is further configured to determine the first cyclic shift $m_0$ and the second cyclic shift $m_1$ associated with at least one cell ID $N_{ID}$ according to one or more in the group of:

the first cyclic shift $m_0$ and the second cyclic shift $m_1$ are equal; $m_0=m_1$;

the first cyclic shift $m_0$ and the second cyclic shift $m_1$ are different from each other; $m_0 \neq m_1$;

the first cyclic shift $m_0$ is larger than the second cyclic shift $m_1$; $m_0 > m_1$;

the first cyclic shift $m_0$ is smaller than the second cyclic shift $m_1$; $m_0 < m_1$;

two cyclic shift pairs $(m_0, m_1)$ and $(m'_0, m'_1)$ satisfy at most one of $m'_0=m_0+1$ and $m'_1=m_1+1$;

two cyclic shift pairs $(m_0, m_1)$ and $(m'_0, m'_1)$ satisfy at most one of $m'_0=m_0+1$ and $m'_1=m_1+1$, and the first cyclic shift $m_0$ is larger than the second cyclic shift $m_1$; $m_0 > m_1$;

two cyclic shift pairs $(m_0, m_1)$ and $(m'_0, m'_1)$ satisfy at most one of $m'_0=m_0+1$ and $m'_1=m_1+1$, and the first cyclic shift $m_0$ is smaller than the second cyclic shift $m_1$; $m_0 < m_1$;

two cyclic shift pairs $(m_0, m_1)$ and $(m'_0, m'_1)$ that satisfy both of $m'_0=m_0+1$ and $m'_1=m_1+1$ are associated with different primary synchronization signal sequence indices;

two cyclic shift pairs $(m_0, m_1)$ and $(m'_0, m'_1)$ that satisfy both of $m'_0=m_0+1$ and $m'_1=m_1+1$ are associated with different primary synchronization signal sequence indices, and the first cyclic shift $m_0$ is larger than the second cyclic shift $m_1$; $m_0 > m_1$; and two cyclic shift pairs $(m_0, m_1)$ and $(m'_0, m'_1)$ that satisfy both of $m'_0=m_0+1$ and $m'_1=m_1+1$ are associated with different primary synchronization signal sequence indices, and the first cyclic shift $m_0$ is smaller than the second cyclic shift $m_1$; $m_0 < m_1$.

An advantage with this implementation form is that a flexible generation of the secondary synchronization signal SSS sequences is enabled, which is robust against large frequency offsets. It is also advantageous as it enables the possibility to further encode 5 ms timing and/or other additional information into the secondary synchronization signal SSS sequences.

In an implementation form of a processing device according to the first aspect, the processing device is further configured to determine the first cyclic shift $m_0$ and the second cyclic shift $m_1$ as:

$$m_0 = g\left(\left\lfloor \frac{N_{ID}^{(1)}}{L'} \right\rfloor + \left(\left\lfloor \frac{N_{ID,max}^{(1)}}{L'} \right\rfloor + 1\right)N_{ID}^{(2)}\right)$$

$$m_1 = (N_{ID}^{(1)} \bmod L');$$

wherein:

g is an integer larger than 1;

L' is a positive integer smaller or equal to a length L of the secondary synchronization signal sequence;

$N_{ID}^{(1)}$ is an index of the secondary synchronization signal sequence; $N_{ID}^{(1)} \in \{0, 1, 2, \ldots, N_{ID,max}^{(1)}-1\}$;

$N_{ID}^{(2)}$ is an index of the primary synchronization signal sequence; $N_{ID}^{(2)} \in \{0, 1, \ldots, N_{ID,max}^{(2)}-1\}$;

$\lfloor \ldots \rfloor$ is a floor function; and mod is a modulo operation.

An advantage with this implementation form is that robustness against large frequency offsets is guaranteed. It also allows the full use of all the cyclic shifts $m_1$ of the second binary sequence, e.g., by letting L'=L, such that given the total number of cell IDs to be encoded into the secondary synchronization signal SSS sequences, the number of candidate cyclic shifts $m_0$ of the first binary sequence can be kept at a minimum. This is advantageous as the detection of the secondary synchronization signal SSS sequences at the client device can hereby be implemented with low complexity. In other words, the client device can first descramble the received signal sequence with a minimum number of cyclic shift hypotheses of the first binary sequence, such that after descrambling under the correct cyclic shift hypothesis of the first binary sequence, the remaining received signal sequence is only the second binary sequence with a certain unknown cyclic shift, that can be detected by utilizing the low-cost fast Walsh-Hadamard transform FWHT operation.

In an implementation form of a processing device according to the first aspect, the processing device is further configured to determine first cyclic shift $m_0$ and the second cyclic shift $m_1$ as:

$$m_0 = g\left(\left\lfloor \frac{N_{ID}^{(1)}}{L'} \right\rfloor + \left(\left\lfloor \frac{N_{ID,max}^{(1)}}{L'} \right\rfloor + 1\right)N_{ID}^{(2)}\right)$$

$$m_1 = (N_{ID}^{(1)} \bmod L') + m_0 + 1;$$

wherein:

g is an integer larger than 1;

L' is a positive integer smaller or equal to a length L of the secondary synchronization signal sequence;

$N_{ID}^{(1)}$ is an index of the secondary synchronization signal sequence; $N_{ID}^{(1)} \in \{0, 1, 2, \ldots, N_{ID,max}^{(1)}-1\}$;

$N_{ID}^{(2)}$ is an index of the primary synchronization signal sequence; $N_{ID}^{(2)} \in \{0, 1, \ldots, N_{ID,max}^{(2)}-1\}$;

$\lfloor \ldots \rfloor$ is a floor function; and mod is a modulo operation.

An advantage with this implementation form is that robustness against large frequency offsets is guaranteed. It also allows a low-cost detection of the secondary synchronization signal SSS sequences at the client device based on descrambling and FWHT operation. Furthermore, this implementation form generates the first cyclic shift $m_0$ and the second cyclic shift $m_1$ that all satisfy $m_0<m_1$ (or equivalently $m_0>m_1$). This enables the possibility of further encoding 5 ms timing and/or other additional information into the secondary synchronization signal SSS sequences by simply swapping the values of $m_0$ and $m_1$. Alternatively, it constitutes a future-proof solution if it is deemed useful to later on increase the number of hypotheses in the secondary synchronization signal SSS sequences.

In an implementation form of a processing device according to the first aspect, the processing device is further configured to determine the first cyclic shift $m_0$ and the second cyclic shift $m_1$ as:

$$m_0 = g\left(N_{ID,max}^{(2)} \left\lfloor \frac{N_{ID}^{(1)}}{L'} \right\rfloor + N_{ID}^{(2)}\right)$$

$$m_1 = (N_{ID}^{(1)} \bmod L')$$

wherein:

g is an integer equal to or larger than 1;

L' is a positive integer smaller or equal to a length L of the secondary synchronization signal sequence;

$N_{ID}^{(1)}$ is an index of the secondary synchronization signal sequence; $N_{ID}^{(1)} \in \{0, 1, 2, \ldots, N_{ID,max}^{(1)}-1\}$;

$N_{ID}^{(2)}$ is an index of the primary synchronization signal sequence; $N_{ID}^{(2)} \in \{0, 1, \ldots, N_{ID,max}^{(2)}-1\}$;

$\lfloor \ldots \rfloor$ is a floor function; and mod is a modulo operation.

An advantage with this implementation form is that robustness against large frequency offsets is guaranteed. It also allows a low-cost detection of the secondary synchronization signal SSS sequences at the client device based on descrambling and FWHT operation. Furthermore, when g=1, this implementation form allows the selection of two cyclic shift pairs $(m_0, m_1)$ and $(m'_0, m'_1)$ that satisfy both of $m'_0=m_0+1$ and $m'_1=m_1+1$, but associates the corresponding pair of two generated secondary synchronization signal SSS sequences with different primary synchronization signal PSS sequence indices. Thus, more valid values of cyclic shift pairs $(m_0, m_1)$ can be selected, which potentially enables the encoding of a larger number of cell IDs to the secondary synchronization signal SSS sequences without increasing the SSS sequence length.

In an implementation form of a processing device according to the first aspect, the processing device is further configured to determine the first cyclic shift $m_0$ and the second cyclic shift $m_1$ as:

$$m_0 = g\left(N_{ID,max}^{(2)} \left\lfloor \frac{N_{ID}^{(1)}}{L'} \right\rfloor + N_{ID}^{(2)}\right)$$

$$m_1 = (N_{ID}^{(1)} \bmod L') + m_0 + 1$$

wherein:

g is an integer equal to or larger than 1;

L' is a positive integer smaller or equal to a length L of the secondary synchronization signal sequence;

$N_{ID}^{(1)}$ is an index of the secondary synchronization signal sequence; $N_{ID}^{(1)} \in \{0, 1, 2, \ldots, N_{ID,max}^{(1)}-1\}$;

$N_{ID}^{(2)}$ is an index of the primary synchronization signal sequence; $N_{ID}^{(2)} \in \{0, 1, \ldots, N_{ID,max}^{(2)}-1\}$;

$\lfloor \ldots \rfloor$ is a floor function; and mod is a modulo operation.

An advantage with this implementation form is that robustness against large frequency offsets is guaranteed. It also allows a low-cost detection of the secondary synchronization signal SSS sequences at the client device based on descrambling and FWHT operation. Furthermore, when g=1, this implementation form allows the selection of two cyclic shift pairs $(m_0, m_1)$ and $(m'_0, m'_1)$ that satisfy both of $m'_0=m_0+1$ and $m'_1=m_1+1$, but associates the corresponding pair of two generated secondary synchronization signal SSS sequences with different primary synchronization signal PSS sequence indices. Thus, more valid values of cyclic shift pairs $(m_0, m_1)$ can be selected, which potentially enables the encoding of a larger number of cell IDs to the secondary synchronization signal SSS sequences without increasing the SSS sequence length. In addition, this implementation form generates the first cyclic shift $m_0$ and the second cyclic shift $m_1$ that all satisfy $m_0<m_1$ (or equivalently $m_0>m_1$). This enables the possibility of further encoding 5 ms timing and/or other additional information into the secondary synchronization signal SSS sequences by simply swapping the values of $m_0$ and $m_1$. Alternatively, it constitutes a future-proof solution if it is deemed useful to later on increase the number of hypotheses in the secondary synchronization signal SSS sequences.

According to a second aspect of the invention, the above mentioned and other objectives are achieved with a network node, the network node comprising:

a processing device configured to generate a secondary synchronization signal sequence according to any of the implementation forms according to the first aspect or to the first aspect as such; and a transceiver configured to transmit synchronization signals based on a primary synchronization signal sequence and on the secondary synchronization signal sequence.

A network node according to the second aspect provides a number of advantages over conventional solutions. An advantage of the network node is that it enables a simple and efficient method to generate the secondary synchronization signal SSS sequences.

According to a third aspect of the invention, the above mentioned and other objectives are achieved with a client device, the client device comprising:

a processing device configured to generate a secondary synchronization signal sequence according to any of the implementation forms according to the first aspect or to the first aspect as such;

a transceiver configured to receive a secondary synchronization signal by utilization of the generated secondary synchronization signal sequence; and the processing device further configured to determine a cell ID $N_{ID}$ based on a first cyclic shift $m_0$ and a second cyclic shift $m_1$ being determined based on a received primary synchronization signal and on the received secondary synchronization signal.

A client device according to the third aspect provides a number of advantages over conventional solutions. An advantage of the client device is that it enables a simple and efficient method to generate the secondary synchronization signal SSS sequences, a low-complexity approach for detecting the secondary synchronization signal SSS sequences, and a simple and efficient method to decode the cell ID $N_{ID}$ from the first cyclic shift $m_0$ and the second cyclic shift $m_1$ being determined from the detected secondary synchronization signal SSS sequence.

According to a fourth aspect of the invention, the above mentioned and other objectives are achieved with a method for determining a secondary synchronization sequence to be utilized together with a primary synchronization signal sequence for synchronization, the method comprises:

determining a first cyclic shift $m_0$ and a second cyclic shift $m_1$ based at least on a cell ID $N_{ID}$, wherein at least one of the first cyclic shift $m_0$ and the second cyclic shift $m_1$ is associated with the primary synchronization signal sequence by being determined based also on an index) $N_{ID}^{(2)}$ of the primary synchronization signal sequence; and generating the secondary synchronization signal sequence based on a modulo-2 summation of a first binary sequence cyclically shifted by a first cyclic shift $m_0$ and a second binary sequence cyclically shifted by a second cyclic shift $m_1$, such that if two generated secondary synchronization signal sequences associated with a primary synchronization signal sequence are cyclically shifted versions of each other, the two generated secondary synchronization signal sequences are non-consecutively shifted versions of each other.

In an implementation form of a method according to the fourth aspect, the first and second binary sequences are one in the group of:

m-sequences; and m-sequences resulting in that the generated secondary synchronization signal sequences belong to one set of Gold sequences.

In an implementation form of a method according to the fourth aspect, a number of primary synchronization signal sequences usable for synchronization is one in the group of:

one primary synchronization signal sequence;

two or more primary synchronization signal sequences; and three primary synchronization signal sequences.

In an implementation form of a method according to the fourth aspect, the generated secondary synchronization signal sequence has a length L of 127; L=127.

In an implementation form of a method according to the fourth aspect, the method further comprises determining the first cyclic shift $m_0$ and the second cyclic shift $m_1$ associated with at least one cell ID $N_{ID}$ according to one or more in the group of:

the first cyclic shift $m_0$ and the second cyclic shift $m_1$ are equal; $m_0=m_1$;

the first cyclic shift $m_0$ and the second cyclic shift $m_1$ are different from each other; $m_0 \neq m_1$;

the first cyclic shift $m_0$ is larger than the second cyclic shift $m_1$; $m_0>m_1$;

the first cyclic shift $m_0$ is smaller than the second cyclic shift $m_1$; $m_0<m_1$;

two cyclic shift pairs $(m_0, m_1)$ and $(m'_0, m'_1)$ satisfy at most one of $m'_0=m_0+1$ and $m'_1=m_1+1$;

two cyclic shift pairs $(m_0, m_1)$ and $(m'_0, m'_1)$ satisfy at most one of $m'_0=m_0+1$ and $m'_1=m_1+1$, and the first cyclic shift $m_0$ is larger than the second cyclic shift $m_1$; $m_0>m_1$;

two cyclic shift pairs $(m_0, m_1)$ and $(m'_0, m'_1)$ satisfy at most one of $m'_0=m_0+1$ and $m'_1=m_1+1$, and the first cyclic shift $m_0$ is smaller than the second cyclic shift $m_1$; $m_0<m_1$;

two cyclic shift pairs $(m_0, m_1)$ and $(m'_0, m'_1)$ that satisfy both of $m'_0=m_0+1$ and $m'_1=m_1+1$ are associated with different primary synchronization signal sequence indices;

two cyclic shift pairs $(m_0, m_1)$ and $(m'_0, m'_1)$ that satisfy both of $m'_0=m_0+1$ and $m'_1=m_1+1$ are associated with different primary synchronization signal sequence indices, and the first cyclic shift $m_0$ is larger than the second cyclic shift $m_1$; $m_0>m_1$; and two cyclic shift pairs $(m_0, m_1)$ and $(m'_0, m'_1)$ that satisfy both of $m'_0=m_0+1$ and $m'_1=m_1+1$ are associated with different primary synchronization signal sequence indices, and the first cyclic shift $m_0$ is smaller than the second cyclic shift $m_1$; $m_0<m_1$.

In an implementation form of a method according to the fourth aspect, the method further comprises determining the first cyclic shift $m_0$ and the second cyclic shift $m_1$ as:

$$m_0 = g\left(\left\lfloor \frac{N_{ID}^{(1)}}{L'} \right\rfloor + \left(\left\lfloor \frac{N_{ID,max}^{(1)}}{L'} \right\rfloor + 1\right)N_{ID}^{(2)}\right)$$

$$m_1 = (N_{ID}^{(1)} \bmod L');$$

wherein:

g is an integer larger than 1;

L' is a positive integer smaller or equal to a length L of the secondary synchronization signal sequence;

$N_{ID}^{(1)}$ is an index of the secondary synchronization signal sequence; $N_{ID}^{(1)} \in \{0, 1, 2, \ldots, N_{ID,max}^{(1)}-1\}$;

$N_{ID}^{(2)}$ is an index of the primary synchronization signal sequence; $N_{ID}^{(2)} \in \{0, 1, \ldots, N_{ID,max}^{(2)}-1\}$;

$\lfloor \ldots \rfloor$ is a floor function; and mod is a modulo operation.

In an implementation form of a method according to the fourth aspect, the method further comprises determining first cyclic shift $m_0$ and the second cyclic shift $m_1$ as:

$$m_0 = g\left(\left\lfloor \frac{N_{ID}^{(1)}}{L'} \right\rfloor + \left(\left\lfloor \frac{N_{ID,max}^{(1)}}{L'} \right\rfloor + 1\right)N_{ID}^{(2)}\right)$$

$$m_1 = (N_{ID}^{(1)} \bmod L') + m_0 + 1;$$

wherein:

g is an integer larger than 1;

L' is a positive integer smaller or equal to a length L of the secondary synchronization signal sequence;

$N_{ID}^{(1)}$ is an index of the secondary synchronization signal sequence; $N_{ID}^{(1)} \in \{0, 1, 2, \ldots, N_{ID,max}^{(1)}-1\}$;

$N_{ID}^{(2)}$ is an index of the primary synchronization signal sequence; $N_{ID}^{(2)} \in \{0, 1, \ldots, N_{ID,max}^{(2)}-1\}$;

$\lfloor \ldots \rfloor$ is a floor function; and mod is a modulo operation.

In an implementation form of a method according to the fourth aspect, the method further comprises determining the first cyclic shift $m_0$ and the second cyclic shift $m_1$ as:

$$m_0 = g\left(N_{ID,max}^{(2)}\left\lfloor \frac{N_{ID}^{(1)}}{L'} \right\rfloor + N_{ID}^{(2)}\right)$$

$$m_1 = (N_{ID}^{(1)} \bmod L')$$

wherein:

g is an integer equal to or larger than 1;

L' is a positive integer smaller or equal to a length L of the secondary synchronization signal sequence;

$N_{ID}^{(1)}$ is an index of the secondary synchronization signal sequence; $N_{ID}^{(1)} \in \{0, 1, 2, \ldots, N_{ID,max}^{(1)}-1\}$;

$N_{ID}^{(2)}$ is an index of the primary synchronization signal sequence; $N_{ID}^{(2)} \in \{0, 1, \ldots, N_{ID,max}^{(2)}-1\}$;

$\lfloor \ldots \rfloor$ is a floor function; and mod is a modulo operation.

In an implementation form of a method according to the fourth aspect, the method further comprises determining the first cyclic shift $m_0$ and the second cyclic shift $m_1$ as:

$$m_0 = g\left(N_{ID,max}^{(2)}\left\lfloor \frac{N_{ID}^{(1)}}{L'} \right\rfloor + N_{ID}^{(2)}\right)$$

$$m_1 = (N_{ID}^{(1)} \bmod L') + m_0 + 1$$

wherein:

g is an integer equal to or larger than 1;

L' is a positive integer smaller or equal to a length L of the secondary synchronization signal sequence;

$N_{ID}^{(1)}$ is an index of the secondary synchronization signal sequence; $N_{ID}^{(1)} \in \{0, 1, 2, \ldots, N_{ID,max}^{(1)}-1\}$;

$N_{ID}^{(2)}$ is an index of the primary synchronization signal sequence; $N_{ID}^{(2)} \in \{0, 1, \ldots, N_{ID,max}^{(2)}-1\}$;

$\lfloor \ldots \rfloor$ is a floor function; and mod is a modulo operation.

The advantages of any method according to the fourth aspect are the same as those for the corresponding processing device claims according to the first aspect.

According to a fifth aspect of the invention, the above mentioned and other objectives are achieved with a method for a network node, the method comprises:

generating a secondary synchronization signal sequence according to a method according to the fourth aspect; and transmitting synchronization signals based on a primary synchronization signal sequence and on the secondary synchronization signal sequence.

The advantages of any method according to the fifth aspect are the same as those for the corresponding network node claims according to the second aspect.

According to a sixth aspect of the invention, the above mentioned and other objectives are achieved with a method for a client device, the method comprises:

generating a secondary synchronization signal sequence according to a method according to the fourth aspect;

receiving a secondary synchronization signal by utilization of the generated secondary synchronization signal sequence; and determining a cell ID $N_{ID}$ based on a first cyclic shift $m_0$ and a second cyclic shift $m_1$ being determined based on a received primary synchronization signal and on the received secondary synchronization signal.

The advantages of any method according to the sixth aspect are the same as those for the corresponding client device claims according to the third aspect.

The invention also relates to a computer program, characterized in code means, which when run by processing means causes said processing means to execute any method according to the present invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the present invention will be apparent from the following detailed description.

BRIEF DESCRIPTION OF THE DRAWINGS

The appended drawings are intended to clarify and explain different embodiments of the present invention, in which.

DETAILED DESCRIPTION OF THE EMBODIMENTS

Figure 1:
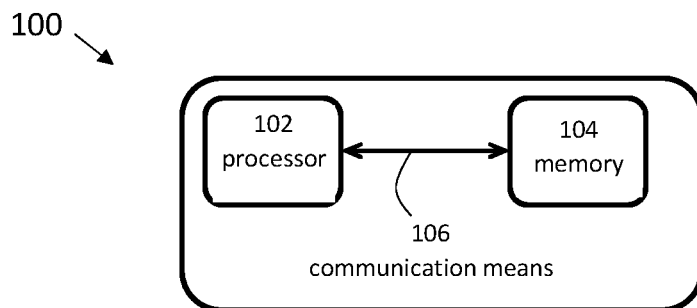
FIG. 1 shows a processing device according to an embodiment of the invention.

FIG. 1 shows a processing device 100 according to an embodiment of the invention. The processing device 100 comprises a processor 102 coupled to a memory 104. The processor 102 and the memory 104 are coupled to each other by communication means 106 known in the art. In an embodiment, the processor 102 may be a dedicated processor for executing the generation of a secondary synchronization signal SSS sequence according to the invention only. In some embodiments, the processor 102 may instead be shared with another processor in a network node or a client device, and perform additional processing.

The processing device 100 for generating a secondary synchronization signal SSS sequence to be utilized together with a primary synchronization signal PSS sequence for synchronization is configured to, e.g. by means of the processor 102, determine a first cyclic shift $m_0$ and a second cyclic shift $m_1$ based at least on a cell ID $N_{ID}$, wherein at least one of the first cyclic shift $m_0$ and the second cyclic shift $m_1$ is associated with the primary synchronization signal PSS sequence by being determined based also on an index $N_{ID}^{(2)}$ of the primary synchronization signal PSS sequence.

The processing device 100 is further configured to, e.g. by means of the processor 102, generate the secondary synchronization signal SSS sequence based on a modulo-2 summation of a first binary sequence cyclically shifted by a first cyclic shift $m_0$ and a second binary sequence cyclically shifted by a second cyclic shift $m_1$, such that if two generated secondary synchronization signal SSS sequences associated with a primary synchronization signal PSS sequence are cyclically shifted versions of each other, the two generated secondary synchronization signal SSS sequences are non-consecutively shifted versions of each other.

Figure 2:
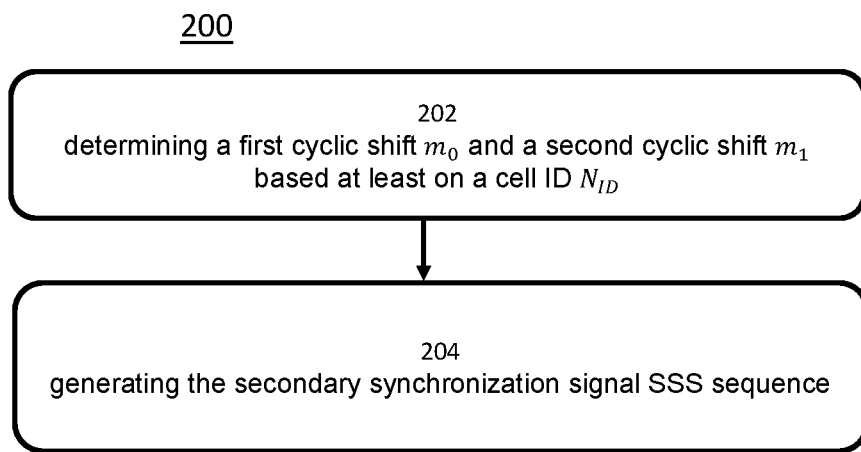
FIG. 2 shows a method for a processing device according to an embodiment of the invention.

FIG. 2 shows a flow chart of a corresponding method 200 which may be executed in a processing device 100, such as the one shown in FIG. 1.

The method 200 comprises a first step 202 of determining a first cyclic shift $m_0$ and a second cyclic shift $m_1$ based at least on a cell ID $N_{ID}$, wherein at least one of the first cyclic shift $m_0$ and the second cyclic shift $m_1$ is associated with the primary synchronization signal PSS sequence by being determined based also on an index $N_{ID}^{(2)}$ of the primary synchronization signal PSS sequence.

The method also comprises a second step 204 of generating the secondary synchronization signal SSS sequence based on a modulo-2 summation of a first binary sequence cyclically shifted by a first cyclic shift $m_0$ and a second binary sequence cyclically shifted by a second cyclic shift $m_1$, such that if two generated secondary synchronization signal SSS sequences associated with a primary synchronization signal PSS sequence are cyclically shifted versions of each other, the two generated secondary synchronization signal SSS sequences are non-consecutively shifted versions of each other.

Figure 3:
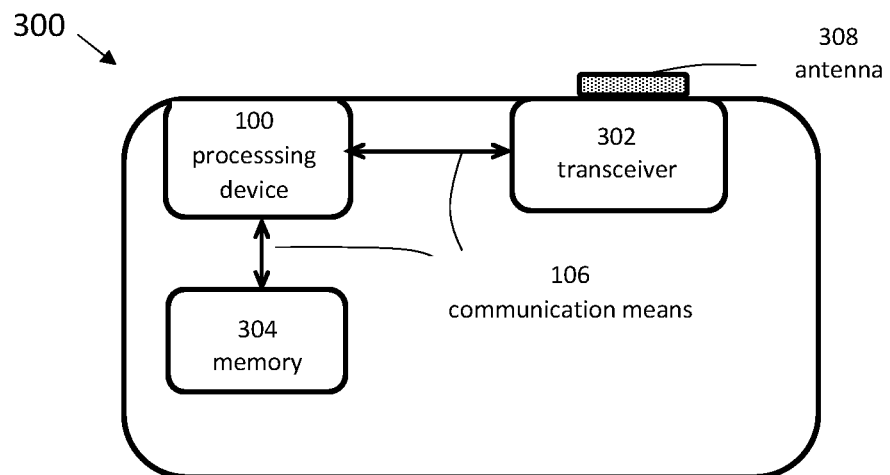
FIG. 3 shows a network node according to an embodiment of the invention.

FIG. 3 shows a network node 300 according to an embodiment of the invention. In the embodiment shown in FIG. 3, the network node 300 comprises the processing device 100, a transceiver 302 and a memory 304. The processing device 100 is coupled to the transceiver 302 and the memory 304 by communication means 306 known in the art. The network node 300 further comprises an antenna 308 coupled to the transceiver 302, which means that the network node 300 is configured for wireless communications in a wireless communication system.

The processing device 100 of the network node 300 is configured to generate a secondary synchronization signal SSS sequence according to any one of the herein described embodiments of the method 200. The transceiver 302 of the network node 300 is configured to transmit synchronization signals based on a primary synchronization signal PSS sequence and on the secondary synchronization signal SSS sequence.

Figure 4:
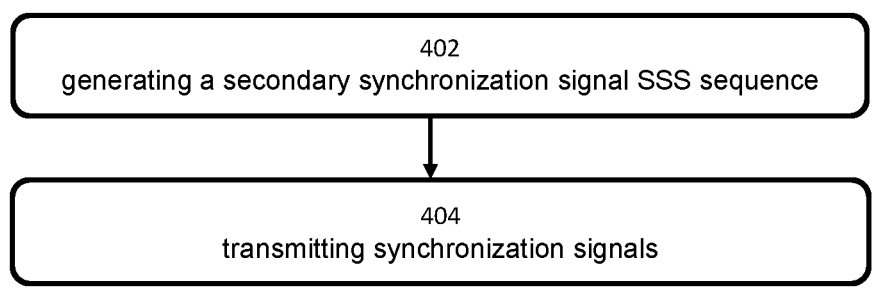
FIG. 4 shows a method for a network node according to an embodiment of the present invention.

FIG. 4 shows a flow chart of a corresponding method 400 which may be executed in a network node 300, such as the one shown in FIG. 3. The method 400 comprises a first step 402 of generating a secondary synchronization signal SSS sequence according to any one of the herein described embodiments of the method 200. The method further comprises a second step 404 of transmitting synchronization signals based on a primary synchronization signal PSS sequence and on the secondary synchronization signal SSS sequence.

Figure 5:
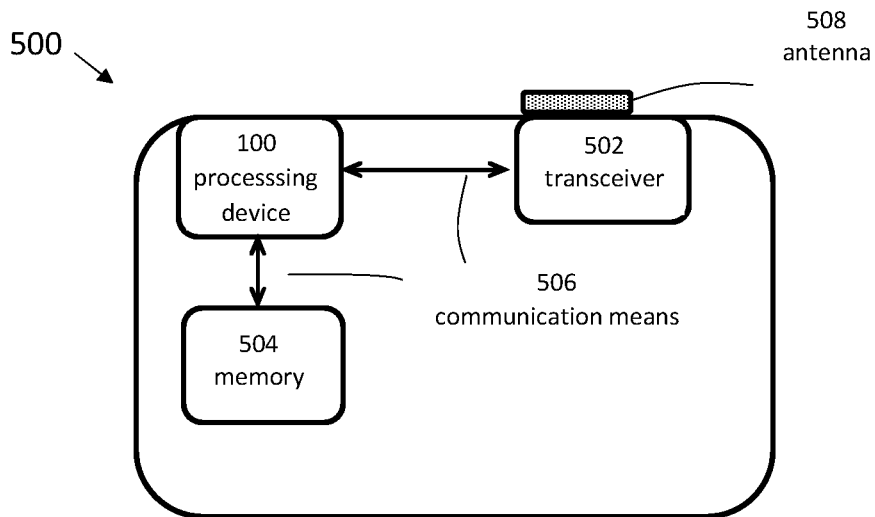
FIG. 5 shows a client device according to an embodiment of the invention.

FIG. 5 shows a client device 500 according to an embodiment of the invention. In the embodiment shown in FIG. 5, the client device 500 comprises the processing device 100, a transceiver 502 and a memory 504. The processing device 100 is coupled to the transceiver 502 and the memory 504 by communication means 506 known in the art. The client device 500 further comprises an antenna 508 coupled to the transceiver 502, which means that the client device 500 is configured for wireless communications in a wireless communication system.

The processing device 100 of the client device 500 is configured to generate a secondary synchronization signal SSS sequence according to any one of the herein described embodiments. The transceiver 502 of the client device 500 is configured to receive a secondary synchronization signal SSS by utilization of the generated secondary synchronization signal SSS sequence. The processing device 100 is further configured to determine a cell ID $N_{ID}$ based on a first cyclic shift $m_0$ and a second cyclic shift $m_1$ being determined based on a received primary synchronization signal PSS and on the received secondary synchronization signal SSS.

Figure 6:
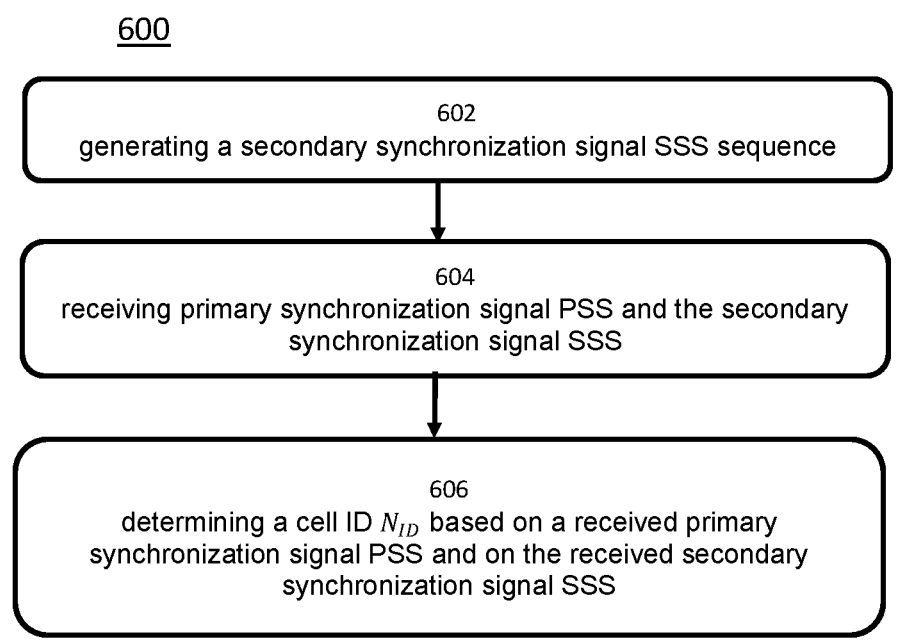
FIG. 6 shows a method for a client device according to an embodiment of the present invention.

FIG. 6 shows a flow chart of a corresponding method 600 which may be executed in a client device 500, such as the one shown in FIG. 5. The method 600 comprises a first step 602 of generating a secondary synchronization signal SSS sequence according to any one of the herein described embodiments of the method 200. The method further comprises a second step 604 of receiving a secondary synchronization signal SSS by utilization of the generated secondary synchronization signal SSS sequence. The method also comprises a third step 606 of determining a cell ID $N_{ID}$ based on a first cyclic shift $m_0$ and a second cyclic shift $m_1$ being determined based on a received primary synchronization signal PSS and on the received secondary synchronization signal SSS.

Figure 7:
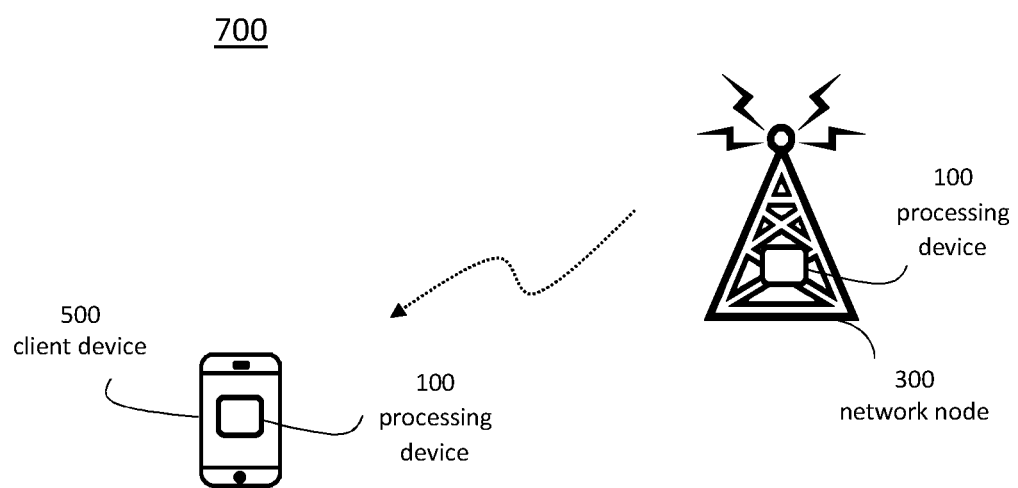
FIG. 7 shows a wireless system according to an embodiment of the present invention.

FIG. 7 shows a wireless communication system 700 according to an embodiment. The wireless communication system 700 comprises a network node 300 and a client device 500 configured to operate in the wireless communication system 700. Furthermore, the network node 300 and the client device 500 each comprises a processing device 100. In the wireless communication system 700, synchronization signals are transmitted by the network node 300 and received by the client device 500. Based on the synchronization signals, the client device 500 performs synchronization with the network node 300 and acquires the cell ID of the network node 300, as described in this document. The synchronisation signals comprise a primary synchronization signal PSS sequence and a secondary synchronization signal SSS sequence, where the secondary synchronization signal SSS sequence is generated by the processing device 100 in the network node 300. The client device 500 receives the synchronization signals using the secondary synchronization signal SSS sequences generated by the processing device 100, e.g. for correlation, in the client device 500, as described in this document.

For simplicity, the wireless communication system 700 shown in FIG. 7 only comprises one network node 300 and one client device 500. However, the wireless communication system 700 may comprise any number of network nodes 300 and any number of client devices 500 without deviating from the scope of the invention.

The network node 300 herein may also be denoted as a radio network node, an access network node, an access point, or a base station, e.g. a Radio Base Station (RBS), which in some networks may be referred to as transmitter, "gNB", "eNB", "eNodeB", "NodeB" or "B node", depending on the technology and terminology used. The radio network nodes may be of different classes such as e.g. macro eNodeB, home eNodeB or pico base station, based on transmission power and thereby also cell size. The radio network node can be a Station (STA), which is any device that contains an IEEE 802.11-conformant Media Access Control (MAC) and Physical Layer (PHY) interface to the Wireless Medium (WM). The network node 300 may also be a base station corresponding to the fifth generation wireless systems.

The client device 500 herein may be denoted as a user device, a User Equipment (UE), a mobile station, an internet of things (IoT) device, a sensor device, a wireless terminal and/or a mobile terminal, and is enabled to communicate wirelessly in a wireless communication system, sometimes also referred to as a cellular radio system. The UEs may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The client device 500 may also be configured for communication in 3GPP related LTE and LTE-Advanced, in WiMAX and its evolution, and in fifth generation wireless technologies, such as New Radio.

Furthermore, any method according to embodiments of the invention may be implemented in a computer program, having code means, which when run by processing means causes the processing means to execute the steps of the method. The computer program is included in a computer readable medium of a computer program product. The computer readable medium may comprises essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the present processing device 100, network node 300, and client device 500 comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processor(s) of the present devices and nodes may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

According to an embodiment, the first and second binary sequences utilized for generating the secondary synchronization signal SSS sequences are pseudorandom maximum length sequences, i.e. m-sequences.

According to an embodiment, the first and second binary sequences utilized for generating the secondary synchronization signal SSS sequences are pseudorandom maximum length sequences, i.e. m-sequences, based on which the generated secondary synchronization signal SSS sequences belong to one set of Gold sequences, so as to guarantee low cross-correlation between the generated SSS sequences. Gold sequences are described more in detail below.

According to an embodiment, one of the first and second binary sequences utilized for generating the secondary synchronization signal SSS sequences is the same binary sequence, e.g. the same pseudorandom maximum length sequence, which is used to generate the one or more primary synchronization signal PSS sequences.

As described below, according to various embodiments, different numbers of primary synchronization signal PSS sequences may be usable for the synchronization signals, such as one primary synchronization signal PSS sequence, two or more primary synchronization signal PSS sequences, and three primary synchronization signal PSS sequences. Thus, the herein described generation of the secondary synchronization signal SSS sequences, may be used together with differing numbers of primary synchronization signal PSS sequence, which provides for a flexible generation of synchronization signals, adaptable for a large number of cell IDs and/or wireless systems.

According to an embodiment, as exemplified below, the generated secondary synchronization signal SSS sequence has a length L of 127; L=127, which fits some of the available and upcoming wireless systems, such that the herein described embodiments may be implemented in these systems.

The invention discloses SSS sequences, d(k), k= 0, 1, 2, . . . , L−1, that may be constructed based on the modulo-2 sum of two length-L binary sequences with different cyclic shifts $m_0$ and $m_1$. According to an embodiment, BPSK modulation is used, i.e.:

$$d(k)=1-2((s_0((k+m_0)\bmod L)+s_1((k+m_1)\bmod L))\bmod 2), k=0, 1, 2, \ldots, L-1; \quad \text{(Eq. 1)}$$

The two binary sequences may e.g. be chosen to be two m-sequences of the same length L with carefully selected generator polynomials, such that all the generated SSS sequences belong to the same set of Gold sequences, which guarantees low cross-correlation between the generated SSS sequences.

For example, the generator polynomials may be selected as $g_0(x)=x^7+x^4+1$ and $g_1(x)=x^7+x+1$, respectively. This generates a set of Gold sequences of length L=127, among which the absolute inner product of any two sequences is either 1, $2^{(n+1)/2}-1=15$ or $2^{(n+1)/2}+1=17$, with n=7 being the highest order of $g_0(x)$ and $g_1(x)$.

According to an embodiment, one of the first and second binary sequences utilized for generating the secondary synchronization signal SSS sequences can be selected as the same binary sequence, e.g. the same pseudoandom maximum length sequence, which is also used to generate primary synchronization signal PSS sequences. Thus, the same binary sequence, e.g. the same m-sequence, may here by used both for generating the primary synchronization signal PSS sequences and for generating one of the first and second binary sequences utilized for generating the secondary synchronization signal SSS sequences.

For example, both the generated primary synchronization signal PSS sequences and the generated secondary synchronization signal SSS sequences may hereby belong to the same set of Gold sequences, whereby a low cross-correlation between the generated secondary synchronization signal SSS sequences and the generated primary synchronization signal PSS sequences is also guaranteed.

The cell ID, $N_{ID}=N_{ID,max}^{(2)}N_{ID}^{(1)}+N_{ID}^{(2)}$, which is carried by the sequence indices of the SSS and PSS, i.e., $N_{ID}^{(1)}\in\{0, 1, 2, \ldots, N_{ID,max}^{(1)}-1\}$ and $N_{ID}^{(2)}\in\{0, 1, \ldots, N_{ID,max}^{(2)}-1\}$, is encoded to the first $m_0$ and second $m_1$ cyclic shifts of the two binary sequences, e.g. the two m-sequences, such that if there are multiple PSSs, at least one of the first $m_0$ and second $m_1$ cyclic shifts depends on the PSS sequence index. Also, if the generated SSS sequences are associated with the same PSS sequence index, they are guaranteed to have low cross-correlation even under large residual frequency offsets, since one SSS sequence cannot be obtained through cyclically shifting another SSS sequence associated with the same PSS index by 1 step.

According to an embodiment, there are no two determined cyclic shift pairs $(m_0, m_1)$ and $(m'_0, m'_1)$ which satisfy both $m'_0=m_0+1$ and $m'_1=m_1+1$. This may in other words be expressed as any two SSS cyclic shift pairs $(m_0, m_1)$ and $(m'_0, m'_1)$ may only satisfy at most one of $m'_0=m_0+1$ and $m'_1=m_1+1$. Hereby, the advantageous robustness against large frequency offsets is guaranteed. Cyclic shift pairs according to this embodiment may for example be achieved by encoding the sequence index carried in PSS, i.e., $N_{ID}^{(2)}\in\{0, 1, \ldots, N_{ID,max}^{(2)}-1\}$, only as the cyclic shift of one of the two binary sequences, say for example to the first cyclic shift $m_0$, and requiring that any two candidate values of the first cyclic shift $m_0$ are distanced from each other by a more than one (1) cyclic shift step. Thus, consecutive cyclic shifts of the first binary sequence are not selected simultaneously, which also means that only non-consecutive cyclic shifts of the first binary sequence may be selected. The total number of candidate values of the first cyclic shift $m_0$ may here be kept at a minimum, such that the low-complexity/cost scrambling-FWHT based SSS detection may be utilized in a client device 500.

The sequence index carried by the SSS, i.e., $N_{ID}^{(1)}\in\{0, 1, 2, \ldots, N_{ID,max}^{(1)}-1\}$ may be encoded as both the first $m_0$ and second $m_1$ cyclic shifts for the first and second binary sequences, where the second cyclic shift $m_1$ is allowed to span all or most of its valid values $\{0, 1, 2, \ldots, L-1\}$. Such an SSS design avoids the event that one SSS sequence is obtainable via cyclically shifting another SSS sequence by 1 cyclic shift step, whereby the robustness against large frequency offsets is guaranteed.

It should be noted that, the encoding of the index $N_{ID}^{(2)}$ of the PSS sequence as the first cyclic shift $m_0$, and the encoding of index $N_{ID}^{(1)}$ of the SSS sequence as the first cyclic shift $m_0$ and the second cyclic shift $m_1$ may be done in an arbitrary manner, e.g., $m_0$ and $m_1$ may be swapped in the equations below. Given the value of the first cyclic shift $m_0$, the number of candidate values for the second cyclic shift $m_1$ may be the same or different for different values of the first cyclic shift $m_0$.

According to an implementation form of the embodiment, the encoding of the index $N_{ID}^{(1)}$ of the SSS sequence and the index $N_{ID}^{(2)}$ of the PSS sequence to the first $m_0$ and second cyclic shifts is given by, i.e. the first cyclic shift $m_0$ and the second cyclic shift $m_1$ are determined as:

$$m_0 = g\left(\left\lfloor\frac{N_{ID}^{(1)}}{L'}\right\rfloor + \left(\left\lfloor\frac{N_{ID,max}^{(1)}}{L'}\right\rfloor + 1\right)N_{ID}^{(2)}\right); \text{ and} \quad \text{(Eq. 2)}$$

$$m_1 = (N_{ID}^{(1)}\bmod L'). \quad \text{(Eq. 3)}$$

Here, g is the minimum cyclic shift step size between the candidate values of the first cyclic shift $m_0$, which is an integer larger than 1. L' is a positive integer smaller or equal to a length L of the SSS sequence; L'≤L; which is also the maximum number of candidate values of the second cyclic shift $m_1$ for a given first cyclic shift $m_0$. Here, and in this document $\lfloor \ldots \rfloor$ denotes a floor function, and mod denotes a modulo operation. Since g>1, the cyclic shifts of any two SSS sequences $(m_0, m_1)$ and $(m'_0, m'_1)$ satisfy at most one of $m'_0=m_0+1$ and $m'_1=m_1+1$.

As a non-limiting example, it may be mentioned that for a New Radio synchronization signal implementation, where L=127 and $N_{ID,max}^{(2)}=3$, this example of the embodiment may be implemented, e.g., by letting g=2, $N_{ID,max}^{(1)}=336$ and L'=112, to carry 336×3=1008 cell IDs in total.

Figure 8:
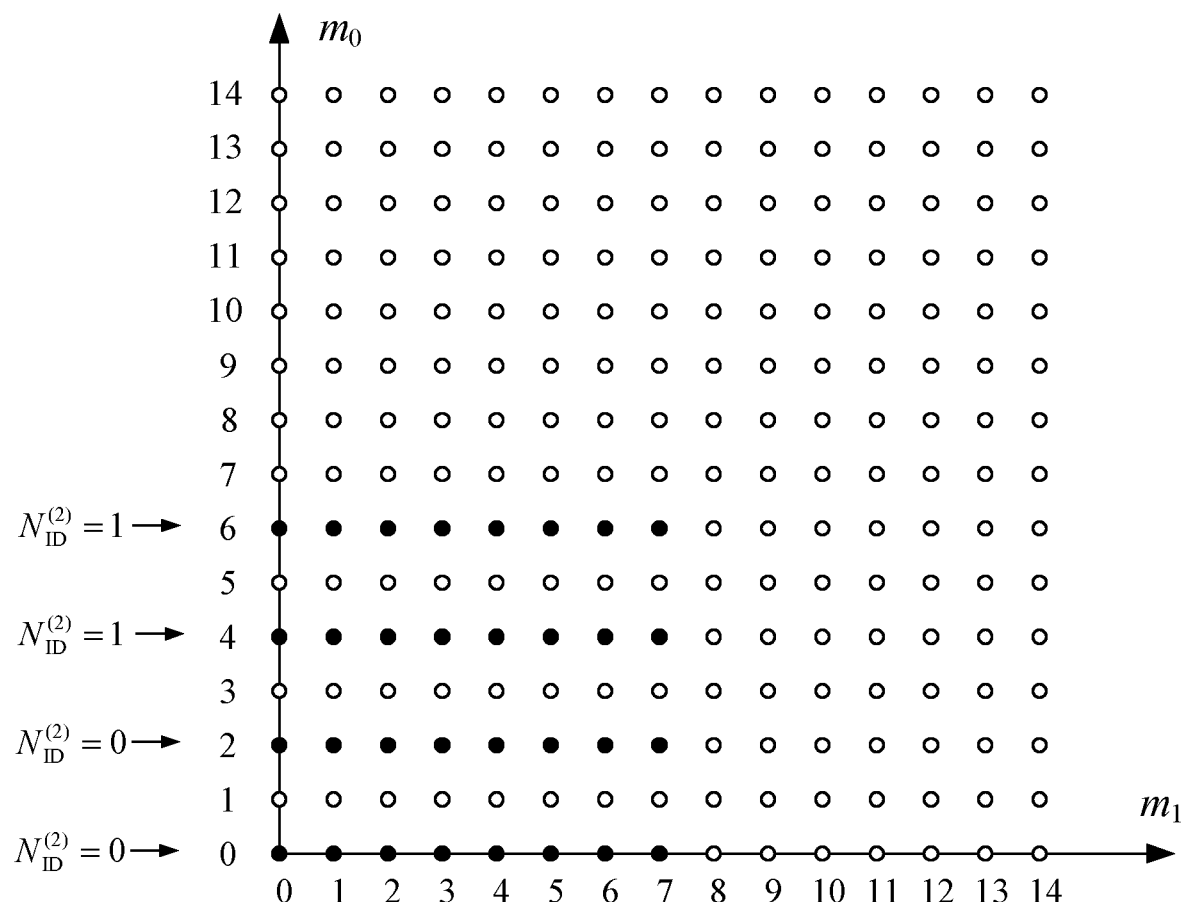
FIG. 8 shows an illustration of determined cyclic shifts according to an embodiment of the present invention.

A schematic and non-limiting illustration of this example of the embodiment is presented in FIG. 8, for $N_{ID,max}^{(1)}=16$, $N_{ID,max}^{(2)}=2$, L=15, g=2 and L'=8. Since g=2, there are no two cyclic shift pairs $(m_0, m_1)$ and $(m'_0, m'_1)$ which satisfy both of $m'_0=m_0+1$ and $m'_1=m_1+1$. This is illustrated in FIG. 8, where every second position along a diagonal direction is left unused, i.e. the positions that may be selected (black points) are in the diagonal direction separated by a position that may not be selected (white points). In this document, the diagonal directions related to the figures include all lines/directions that satisfy $m_0=m_1+c$, where c is any integer. Thus, $m'_0=m_0+1$ and $m'_1=m_1+1$ are not satisfied simultaneously in the illustration in FIG. 8. In FIG. 8, the PSS sequence index $N_{ID}^{(2)}$ is on the y-axis, wherein $m_0=0$ and $m_0=2$ both have the same PSS sequence index $N_{ID}^{(2)}=0$, i.e. both $m_0=0$ and $m_0=2$ are associated with the same PSS sequence index $N_{ID}^{(2)}=0$. Correspondingly, both $m_0=4$ and $m_0=6$ are both are associated with the same PSS sequence index $N_{ID}^{(2)}=1$. It should be noted that the association of the PSS sequence index $N_{ID}^{(2)}$ to the first cyclic shift $m_0$, and the association of the SSS index $N_{ID}^{(1)}$ to $m_0$ and $m_1$, are not constrained to the order shown in FIG. 8. Instead, any other order is also feasible.

In addition, a cell ID $N_{ID}$ may according to an embodiment be determined based on a first cyclic shift $m_0$ and a second cyclic shift $m_1$. This is possible as there exists a simple inverse mapping from the first $m_0$ and second $m_1$ cyclic shift values to the PSS $N_{ID}^{(2)}$ and SSS $N_{ID}^{(1)}$ sequence indices, which for example may be written as:

$$N_{ID}^{(1)} = m_1 + L'\left(\frac{m_0}{g}\text{mod}\left(\left\lfloor\frac{N_{ID,max}^{(1)}}{L'}\right\rfloor+1\right)\right); \text{ and} \quad \text{(Eq. 4)}$$

$$N_{ID}^{(2)} = \left\lfloor\frac{m_0}{g\left(\left\lfloor\frac{N_{ID,max}^{(1)}}{L'}\right\rfloor+1\right)}\right\rfloor. \quad \text{(Eq. 5)}$$

This simplified determination of the PSS and SSS sequence indices, $N_{ID}^{(2)}$ and $N_{ID}^{(1)}$, based on the first $m_0$ and second $m_1$ cyclic shift alleviates the need to implement large tables in the client device for determining the cell IDs from the first $m_0$ and second $m_1$ cyclic shift.

According to an embodiment, there are no two determined cyclic shift pairs $(m_0, m_1)$ and $(m'_0, m'_1)$ which satisfy both $m'_0=m_0+1$ and $m'_1=m_1+1$, i.e. two cyclic shift pairs $(m_0, m_1)$ and $(m'_0, m'_1)$ may only satisfy at most one of $m'_0=m_0+1$ and $m'_1=m_1+1$, at the same time as the determined cyclic shift pairs always satisfy $m_0<m_1$ (or equivalently $m_0>m_1$). Hereby, the advantageous robustness against large frequency offsets is guaranteed.

According to an implementation form of the embodiment, the encoding of sequence index carried in the PSS $N_{ID}^{(1)}$ and the sequence index carried in the SSS $N_{ID}^{(2)}$ to the first $m_0$ and second $m_1$ cyclic shifts is given by, i.e. the first cyclic shift $m_0$ and the second cyclic shift $m_1$ are determined as:

$$m_0 = g\left(\left\lfloor\frac{N_{ID}^{(1)}}{L'}\right\rfloor + \left(\left\lfloor\frac{N_{ID,max}^{(1)}}{L'}\right\rfloor+1\right)N_{ID}^{(2)}\right); \text{ and} \quad \text{(Eq. 6)}$$

$$m_1 = (N_{ID}^{(1)}\text{mod}L') + m_0 + 1, \quad \text{(Eq. 7)}$$

where g>1 is the minimum step size between the candidate values of the first cyclic shift $m_0$ and L'≤L is the maximum number of candidate values of the second cyclic shift $m_1$ for a given first cyclic shift $m_0$. Since g>1, the cyclic shift pairs of any two SSS sequences, e.g., $(m_0, m_1)$ and $(m'_0, m'_1)$, satisfy at most one of $m'_0=m_0+1$ and $m'_1=m_1+1$. Also, the generated cyclic shift pairs always satisfy $m_0<m_1$ (or alternatively $m_0>m_1$). If the SSS is transmitted two times per 10 ms, i.e. once in each half of the frame, this is advantageous as it allows the indication of 5 ms timing using SSS sequences (as done e.g. in LTE) by simply swapping the values of $m_0$ and $m_1$ between the halves of a frame. Alternatively, the implementation form provides a future-proof solution e.g. for future New Radio releases if it is later on deemed useful to increase the number of hypotheses in the SSS.

As a non-limiting example, it may be mentioned that for a New Radio synchronization signal implementation, where L=127 and $N_{ID,max}^{(2)}=3$, the implementation form may be implemented, e.g., by letting g=2, $N_{ID,max}^{(1)}=336$ and L'=115, to carry 336×3=1008 cell IDs in total.

Figure 9:
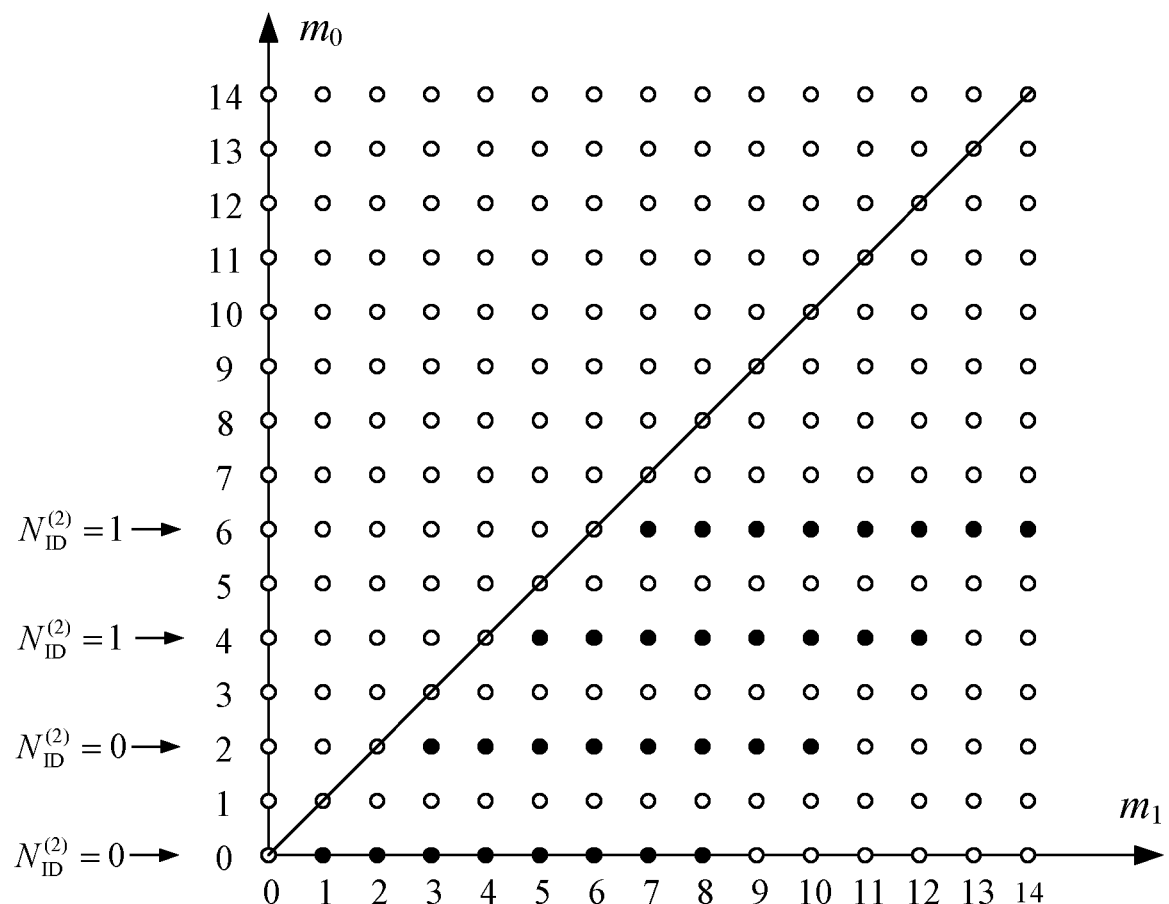
FIG. 9 shows another illustration of determined cyclic shifts according to an embodiment of the present invention.

A non-limiting example illustration of this implementation form is presented in FIG. 9 for $N_{ID,max}^{(1)}=16$, $N_{ID,max}^{(2)}=2$, L=15, g=2 and L'=8. In FIG. 9, the PSS sequence index $N_{ID}^{(2)}$ is on the y-axis, wherein $m_0=0$ and $m_0=2$ both have the same the PSS sequence index $N_{ID}^{(2)}=0$, i.e. both $m_0=0$ and $m_0=2$ are associated with the same PSS sequence index $N_{ID}^{(2)}=0$. Correspondingly, both $m_0=4$ and $m_0=6$ are both are associated with the same PSS sequence index $N_{ID}^{(2)}=1$. It should be noted that the association to the PSS sequence index $N_{ID}^{(2)}$ to the first cyclic shift $m_0$, and the association of the SSS sequence index $N_{ID}^{(1)}$ to the first $m_0$ and second $m_1$ cyclic shifts, are not constrained to the order shown in FIG. 9, e.g., any other order is also feasible.

In addition, a cell ID $N_{ID}$ may according to an embodiment be determined based on a first cyclic shift $m_0$ and a second cyclic shift $m_1$. This is possible as there exists a simple inverse mapping from the first $m_0$ and second $m_1$ cyclic shift values to the PSS $N_{ID}^{(2)}$ and SSS $N_{ID}^{(1)}$ sequence indices, which for example may be written as:

$$N_{ID}^{(1)} = m_1 + L'\left(\frac{m_0}{g}\text{mod}\left(\left\lfloor\frac{N_{ID,max}^{(1)}}{L'}\right\rfloor+1\right)\right) - m_0 - 1; \text{ and} \quad \text{(Eq. 8)}$$

$$N_{ID}^{(2)} = \left\lfloor\frac{m_0}{g\left(\left\lfloor\frac{N_{ID,max}^{(1)}}{L'}\right\rfloor+1\right)}\right\rfloor. \quad \text{(Eq. 9)}$$

This simple determination of the PSS $N_{ID}^{(2)}$ and SSS $N_{ID}^{(1)}$ sequence indices based on the first $m_0$ and second $m_1$ cyclic shift alleviates the need to implement large tables in the client device for determining the cell IDs from the first $m_0$ and second $m_1$ cyclic shift.

According to an implementation form of the embodiment, the encoding of the index $N_{ID}^{(1)}$ of the SSS sequence and the index $N_{ID}^{(2)}$ of the PSS sequence to the first $m_0$ and second $m_1$ cyclic shifts is given by, i.e. the first cyclic shift $m_0$ and the second cyclic shift $m_1$ are determined as:

$$m_0 = g\left(N_{ID,max}^{(2)}\left\lfloor\frac{N_{ID}^{(1)}}{L'}\right\rfloor + N_{ID}^{(2)}\right) \quad \text{(Eq. 10)}$$

$$m_1 = (N_{ID}^{(1)}\text{mod}L') \quad \text{(Eq. 11)}$$

Here, g is the minimum cyclic shift step size between the candidate values of the first cyclic shift $m_0$, which is an integer larger than 1; g>1. L' is a positive integer smaller or equal to a length L of the SSS sequence; L'≤L; which is also the maximum number of candidate values of the second cyclic shift $m_1$ for a given first cyclic shift $m_0$. Since g>1, the cyclic shift pairs of any two SSS sequences $(m_0, m_1)$ and $(m'_0, m'_1)$ satisfy at most one of $m'_0=m_0+1$ and $m'_1=m_1+1$.

As a non-limiting example, it may be mentioned that for a New Radio synchronization signal implementation, where L=127 and $N_{ID,max}^{(2)}$=3, this example of the embodiment may be implemented, e.g., by letting g=2, $N_{ID,max}^{(1)}$=336 and L'=112, to carry 336×3=1008 cell IDs in total.

Figure 10:
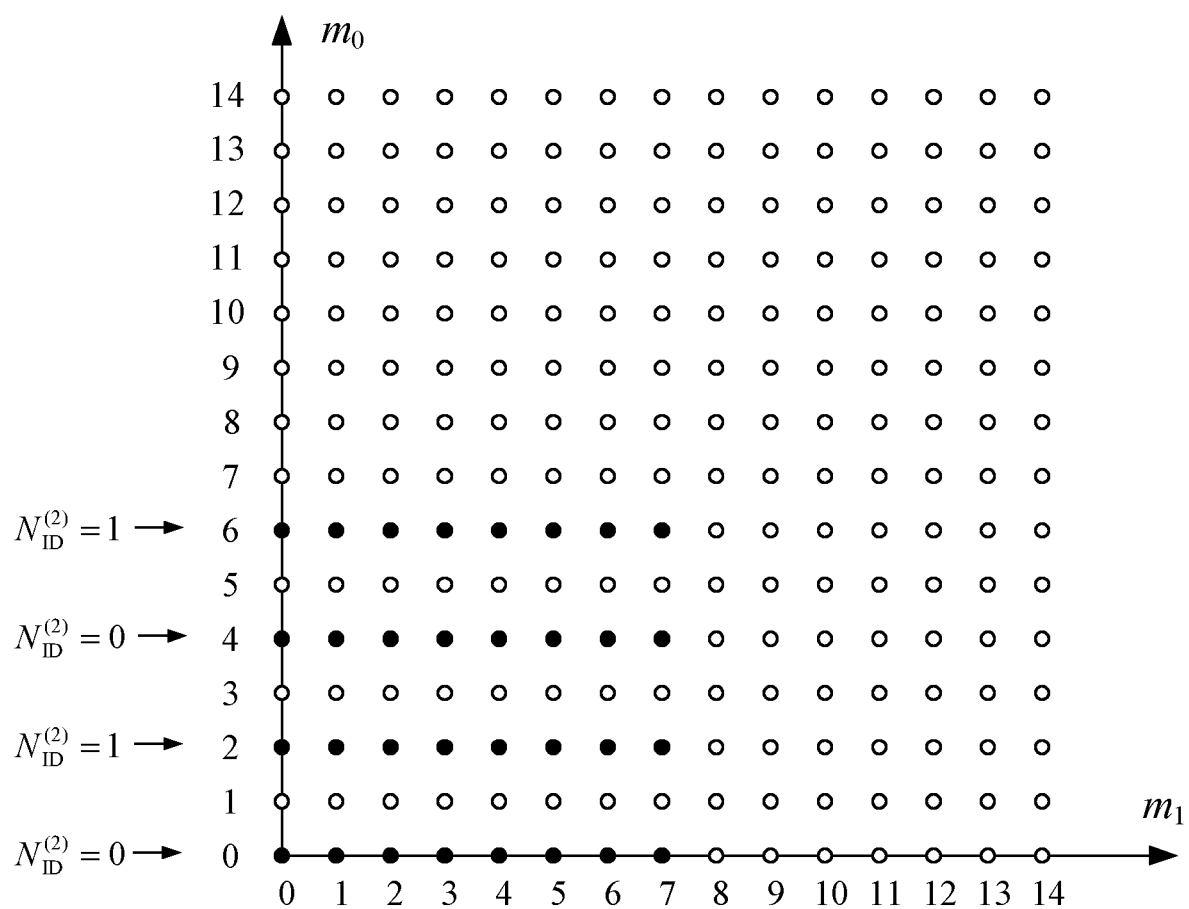
FIG. 10 shows another illustration of determined cyclic shifts according to an embodiment of the present invention.

A schematic and non-limiting illustration of this example of the embodiment is presented in FIG. 10, for $N_{ID,max}^{(1)}$=16, $N_{ID,max}^{(2)}$=2, L=15, g=2 and L'=8. Since g=2, there are no two cyclic shift pairs ($m_0$, $m_1$) and ($m'_0$, $m'_1$) which satisfy both of $m'_0=m_0+1$ and $m'_1=m_1+1$. This is illustrated in FIG. 10, where every second position along a diagonal is left unused, i.e. the positions that may be selected (black points) are in the diagonals separated by a position that may not be selected (white points). Thus, $m'_0=m_0+1$ and $m'_1=m_1+1$ are not satisfied simultaneously in the illustration in FIG. 10. In FIG. 10, the PSS sequence index $N_{ID}^{(2)}$ is on the y-axis, wherein $m_0=0$ and $m_0=4$ both have the same the PSS sequence index $N_{ID}^{(2)}=0$, i.e. both $m_0=0$ and $m_0=4$ are associated with the same PSS sequence index $N_{ID}^{(2)}=0$. Correspondingly, both $m_0=2$ and $m_0=6$ are both are associated with the same PSS sequence index $N_{ID}^{(2)}=1$. It should be noted that the association of the PSS sequence index $N_{ID}^{(2)}$ to the first cyclic shift $m_0$, and the association of the SSS index $N_{ID}^{(1)}$ to $m_0$ and $m_1$, are not constrained to the order shown in FIG. 10. Instead, any other order is also feasible.

In addition, a cell ID $N_{ID}$ may according to an embodiment be determined based on a first cyclic shift $m_0$ and a second cyclic shift $m_1$. This is possible as there exists a simple inverse mapping from the first $m_0$ and second $m_1$ cyclic shift values to the PSS $N_{ID}^{(2)}$ and SSS $N_{ID}^{(1)}$ sequence indices, which for example may be written as:

$$N_{ID}^{(1)} = m_1 + L' \left\lfloor \frac{m_0}{gN_{ID,max}^{(2)}} \right\rfloor \quad \text{(Eq. 12)}$$

$$N_{ID}^{(2)} = (m_0/g \bmod N_{ID,max}^{(2)}) \quad \text{(Eq. 13)}$$

This simplified determination of the PSS $N_{ID}^{(2)}$ and SSS $N_{ID}^{(1)}$ sequence indices based on the first $m_0$ and second $m_1$ cyclic shift alleviates the need to implement large tables in the client device for determining the cell IDs from the first $m_0$ and second $m_1$ cyclic shift.

According to an implementation form of the embodiment, the encoding of sequence index carried in the PSS $N_{ID}^{(1)}$ and the sequence index carried in the SSS $N_{ID}^{(2)}$ to the first $m_0$ and second $m_1$ cyclic shifts is given by, i.e. the first cyclic shift $m_0$ and the second cyclic shift $m_1$ are determined as:

$$m_0 = g\left(N_{ID,max}^{(2)} \left\lfloor \frac{N_{ID}^{(1)}}{L'} \right\rfloor + N_{ID}^{(2)}\right) \quad \text{(Eq. 14)}$$

$$m_1 = (N_{ID}^{(1)} \bmod L') + m_0 + 1, \quad \text{(Eq. 15)}$$

where g>1 is the minimum step size between the candidate values of the second cyclic shift $m_1$ and L'≤L is the maximum number of candidate values of the second cyclic shift $m_1$ for a given first cyclic shift $m_0$. Since g>1, the cyclic shift pairs of any two SSS sequences, e.g., ($m_0$, $m_1$) and ($m'_0$, $m'_1$), satisfy at most one of $m'_0=m_0+1$ and $m'_1=m_1+1$. Meanwhile, the generated/selected cyclic shift pairs always satisfy $m_0<m_1$ (or alternatively $m_0>m_1$). If the SSS is transmitted two times per 10 ms, i.e. once in each half of the frame, this is advantageous as it allows the indication of 5 ms timing using SSS sequences (as done e.g. in LTE) by simply swapping the values of $m_0$ and $m_1$ between the halves of a frame. Alternatively, the implementation form provides a future-proof solution e.g. for future New Radio releases if it is later on deemed useful to increase the number of hypotheses in the SSS.

As a non-limiting example, it may be mentioned that for at New Radio synchronization signal implementation, where L=127 and $N_{ID,max}^{(2)}$=3, the implementation form may be implemented, e.g., by letting g=2, $N_{ID,max}^{(1)}$=336 and L'=115, to carry 336×3=1008 cell IDs in total.

Figure 11:
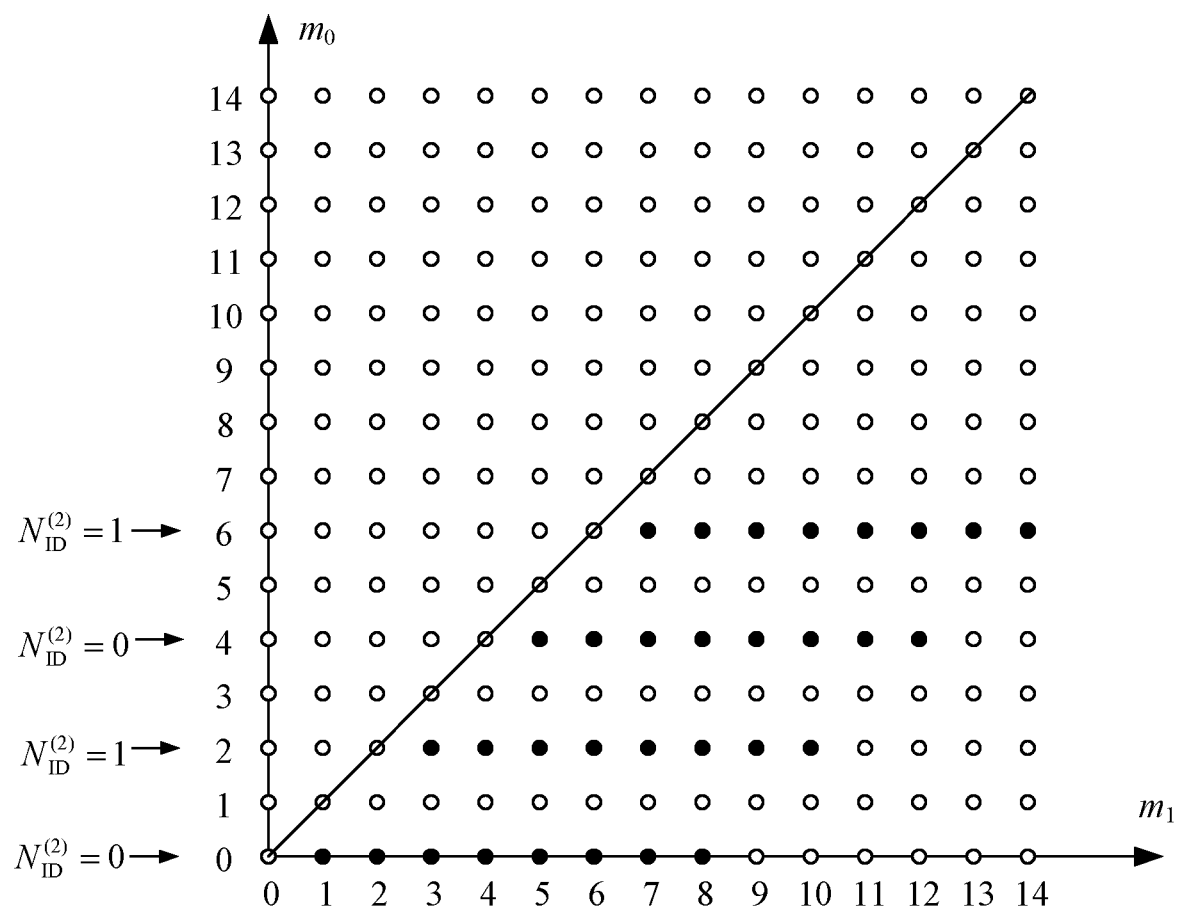
FIG. 11 shows another illustration of determined cyclic shifts according to an embodiment of the present invention.

A non-limiting example illustration of this implementation form is presented in FIG. 11 for $N_{ID,max}^{(1)}$=16, $N_{ID,max}^{(2)}$=2, L=15, g=2 and L'=8. In FIG. 11, the PSS sequence index $N_{ID}^{(2)}$ is on the y-axis, wherein $m_0=0$ and $m_0=4$ both have the same the PSS sequence index $N_{ID}^{(2)}=0$, i.e. both $m_0=0$ and $m_0=4$ are associated with the same PSS sequence index $N_{ID}^{(2)}=0$. Correspondingly, both $m_0=2$ and $m_0=6$ are both are associated with the same PSS sequence index $N_{ID}^{(2)}=1$. It should be noted that the association to the PSS sequence index $N_{ID}^{(2)}$ to the first cyclic shift $m_0$, and the association of the SSS sequence index $N_{ID}^{(1)}$ to the first $m_0$ and second $m_1$ cyclic shifts, are not constrained to the order shown in FIG. 11, e.g., any other order is also feasible.

In addition, a cell ID $N_{ID}$ may according to an embodiment be determined based on a first cyclic shift $m_0$ and a second cyclic shift $m_1$. This is possible as there exists a simple inverse mapping from the first $m_0$ and second $m_1$ cyclic shift values to the PSS $N_{ID}^{(2)}$ and SSS $N_{ID}^{(1)}$ sequence indices, which for example may be written as:

$$N_{ID}^{(1)} = m_1 + L' \left\lfloor \frac{m_0}{gN_{ID,max}^{(2)}} \right\rfloor - m_0 - 1 \quad \text{(Eq. 16)}$$

$$N_{ID}^{(2)} = (m_0/g \bmod N_{ID,max}^{(2)}) \quad \text{(Eq. 17)}$$

This simple determination of the PSS $N_{ID}^{(2)}$ and SSS $N_{ID}^{(1)}$ sequence indices based on the first $m_0$ and second $m_1$ cyclic shift alleviates the need to implement large tables in the client device for determining the cell IDs from the first $m_0$ and second $m_1$ cyclic shift.

According to an embodiment, two cyclic shift pairs ($m_0$, $m_1$) and ($m'_0$, $m'_1$) are allowed to satisfy both $m'_0=m_0+1$ and $m'_1=m_1+1$ if the two cyclic shift pairs ($m_0$, $m_1$) and ($m'_0$, $m'_1$) are associated with different PSS sequence indices $N_{ID}^{(2)}$. Hereby, robustness against large frequency offsets is guaranteed.

Cyclic shift pairs according to this embodiment may for example be achieved by encoding the sequence index carried in PSS, i.e., $N_{ID}^{(2)} \in \{0, 1, \ldots, N_{ID,max}^{(2)}-1\}$ to non-consecutive cyclic shifts of one of the two binary sequences, say for example to the first cyclic shift $m_0$, i.e. requiring that any two candidate values of the first cyclic shift $m_0$ associated with the same primary synchronization signal PSS sequence index are distanced from each other by a more than one (1) cyclic shift step, and meanwhile allowing different PSS sequence indices $N_{ID}^{(2)}$ to be encoded to consecutive values of the first cyclic shift $m_0$. The total number of the first cyclic shifts $m_0$ is kept minimum such that the low-cost/complexity scrambling-FWHT based SSS detection can be utilized in the client device 500.

The sequence index carried by the SSS, i.e., $N_{ID}^{(1)} \in \{0, 1, \ldots, M_{ID,max}^{(1)}-1\}$ may be encoded as both the cyclic shifts of the two m-sequences $m_0$ and $m_1$, where $m_1$ is allowed to span all or most of its valid values {0, 1, 2, . . . , L−1}. Such an SSS design may lead to the event that one SSS sequence is obtainable via cyclically shifting another SSS sequence by 1 cyclic shift step. However, according to the embodiment, such a pair of SSS sequences are always associated with different PSS sequence indices $N_{ID}^{(2)}$ and will not be detected at the same time after a successful PSS detection in the client device 500.

It should be noted that, the encoding of the index $N_{ID}^{(2)}$ of the PSS sequence as the first cyclic shift $m_0$, and the encoding of index $N_{ID}^{(1)}$ of the SSS sequence as the first cyclic shift $m_0$ and the second cyclic shift $m_1$ may be done in an arbitrary manner, i.e. $m_0$ and $m_1$ may be swapped in the equations below. Given the value of the first cyclic shift $m_0$, the number of candidate values for the second cyclic shift $m_1$ may be the same or different for different values of the first cyclic shift $m_0$.

According to an implementation form of the embodiment, the encoding of the sequence indices $N_{ID}^{(1)}$ and $N_{ID}^{(2)}$ as the first $m_0$ and second $m_1$ cyclic shifts may be given by, i.e. the first $m_0$ and second $m_1$ cyclic shifts may be determined as:

$$m_0 = N_{ID,max}^{(2)} \left\lfloor \frac{N_{ID}^{(1)}}{L'} \right\rfloor + N_{ID}^{(2)}; \text{ and} \quad \text{(Eq. 18)}$$

$$m_1 = (N_{ID}^{(1)} \bmod L'). \quad \text{(Eq. 19)}$$

This is a limited/restricted version of the encoding method in equations (10) and (11) above, since g is here restricted to the value of one; g=1. According to the implementation form, a co-existence of two SSS sequences whose cyclic shift pairs $(m_0, m_1)$ and $(m'_0, m'_1)$ satisfy both $m'_0=m_0+1$ and $m'_1=m_1+1$ is allowed, if they are associated with different PSS indices according to equation (18) and (19). This is advantageous as more valid values of the cyclic shift pairs $(m_0, m_1)$ may be selected, allowing C potentially the encoding of a larger number of cell IDs and possibly other additional information to SSS sequences without increasing the SSS sequence length.

As a non-limiting example, it may be mentioned that for a New Radio synchronization signal implementation, where L=127 and $N_{ID,max}^{(2)}$=3, this implementation for may be used, e.g., by letting $N_{ID,max}^{(1)}$=336 and L'=112, to carry 336×3=1008 cell IDs in total.

Figure 12:
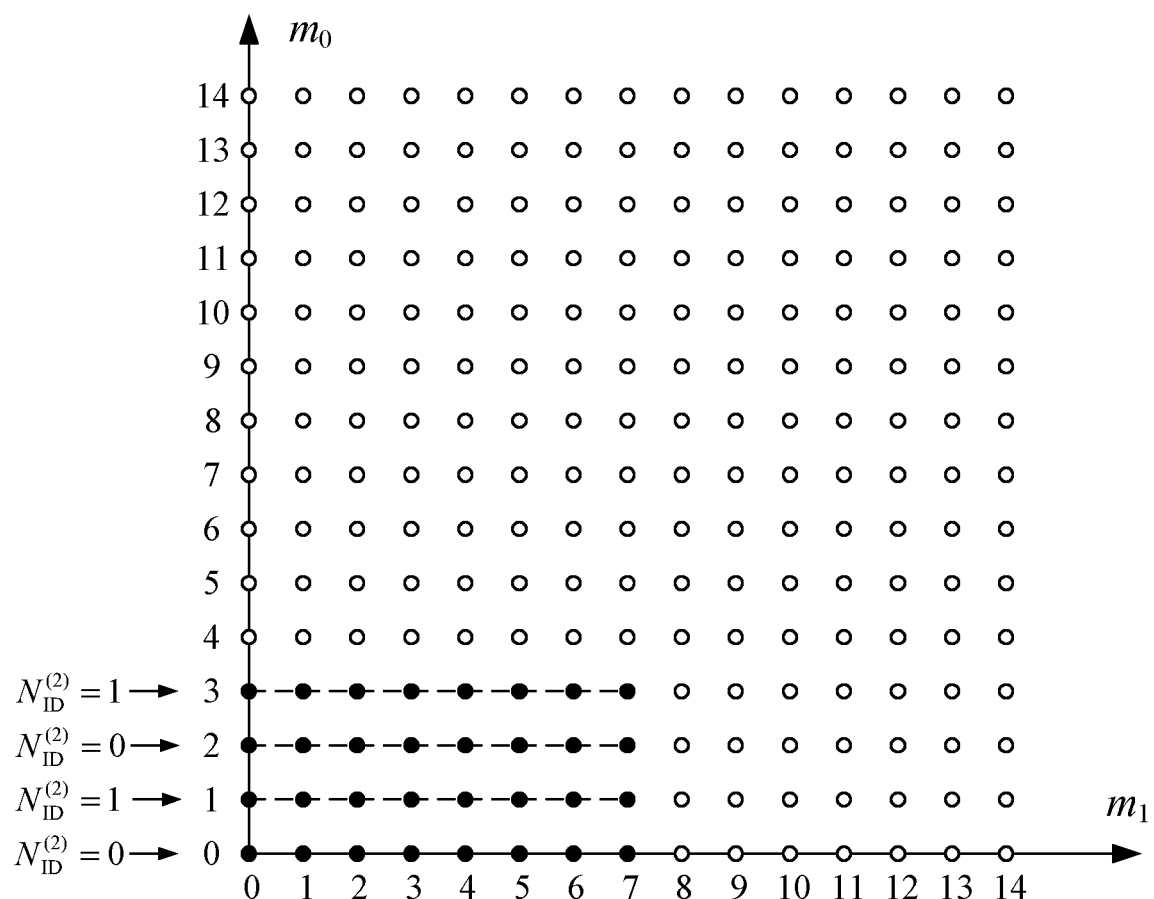
FIG. 12 shows another illustration of determined cyclic shifts according to an embodiment of the present invention.

An illustration of this example is given in FIG. 12 for $N_{ID,max}^{(1)}$=16, $N_{ID,max}^{(2)}$=2, L=15 and L'=8. In FIG. 12, the PSS sequence index $N_{ID}^{(2)}$ is on the y-axis, wherein $m_0$=0 and $m_0$=2 both have the same the PSS sequence index $N_{ID}^{(2)}$=0, i.e. both $m_0$=0 and $m_0$=2 are associated with the same PSS sequence index $N_{ID}^{(2)}$=0. Correspondingly, both $m_0$=1 and $m_0$=3 are both are associated with the same PSS sequence index $N_{ID}^{(2)}$=1. It should be noted that the association of the PSS sequence index $N_{ID}^{(2)}$ to the first cyclic shift $m_0$, and the association of the SSS sequence index $N_{ID}^{(1)}$ to the first $m_0$ and second $m_1$ cyclic shifts, are not constrained to the order shown in FIG. 12. Instead, any other order is feasible as long as the cyclic shift pairs of any two SSS sequences associated to the same PSS index $N_{ID}^{(2)}$, e.g., $(m_0, m_1)$ and $(m'_0, m'_1)$, satisfy at most one of $m'_0=m_0+1$ and $m'_1=m_1+1$.

In addition, a cell ID $N_{ID}$ may, according to an embodiment, be determined based on a first cyclic shift $m_0$ and a second cyclic shift $m_1$. This is possible as there exists a simple inverse mapping from the first $m_0$ and second $m_1$ cyclic shift values to the PSS $N_{ID}^{(2)}$ and SSS $N_{ID}^{(1)}$ sequence indices, which for example may be written as:

$$N_{ID}^{(1)} = m_1 + L' \left\lfloor \frac{m_0}{N_{ID,max}^{(2)}} \right\rfloor \quad \text{(Eq. 20)}$$

$$N_{ID}^{(2)} = (m_0 \bmod N_{ID,max}^{(2)}); \quad \text{(Eq. 21)}$$

which is a restricted/limited version of the inverse mapping in equations (12) and (13) above, for a value of one for g; g=1. This alleviates the need to implement large table in the client device 500 for determining the cell ID from the first $m_0$ and second $m_1$ cyclic shift values.

According to an embodiment, two cyclic shift pairs $(m_0, m_1)$ and $(m'_0, m'_1)$ are allowed to satisfy both $m'_0=m_0+1$ and $m'_1=m_1+1$ if the two cyclic shift pairs $(m_0, m_1)$ and $(m'_0, m'_1)$ are associated with different PSS sequence indices $N_{ID}^{(2)}$, and the generated cyclic shift pairs always satisfy $m_0<m_1$ (or alternatively $m_0>m_1$).

According to an implementation form of the embodiment, the encoding of the sequence indices $N_{ID}^{(1)}$ and $N_{ID}^{(2)}$ as the first $m_0$ and second $m_1$ cyclic shifts may be given by, i.e. the first $m_0$ and second $m_1$ cyclic shifts may be determined as:

$$m_0 = N_{ID,max}^{(2)} \left\lfloor \frac{N_{ID}^{(1)}}{L'} \right\rfloor + N_{ID}^{(2)} \quad \text{(Eq. 22)}$$

$$m_1 = (N_{ID}^{(1)} \bmod L') + m_0 + 1. \quad \text{(Eq. 23)}$$

This is a limited/restricted version of the encoding method in equations (14) and (15) above, since g is here restricted to the value of one; g=1. According to the implementation form, a co-existence of two SSS sequences whose cyclic shift pairs $(m_0, m_1)$ and $(m'_0, m'_1)$ satisfy both $m'_0=m_0+1$ and $m'_1=m_1+1$ is allowed, if they are associated with different PSS indices according to equation (22) and (23), and if the generated cyclic shift pairs always satisfy $m_0<m_1$ (or equivalently $m_0>m_1$). This is advantageous, as stated above, since it allows the indication of 5 ms timing using SSS sequences, as used e.g. in LTE, by swapping $m_0$ and $m_1$ values. Alternatively, it constitutes a future-proof solution for future New Radio releases, if it will later on be deemed useful to increase the number of hypotheses in the SSS.

Figure 13:
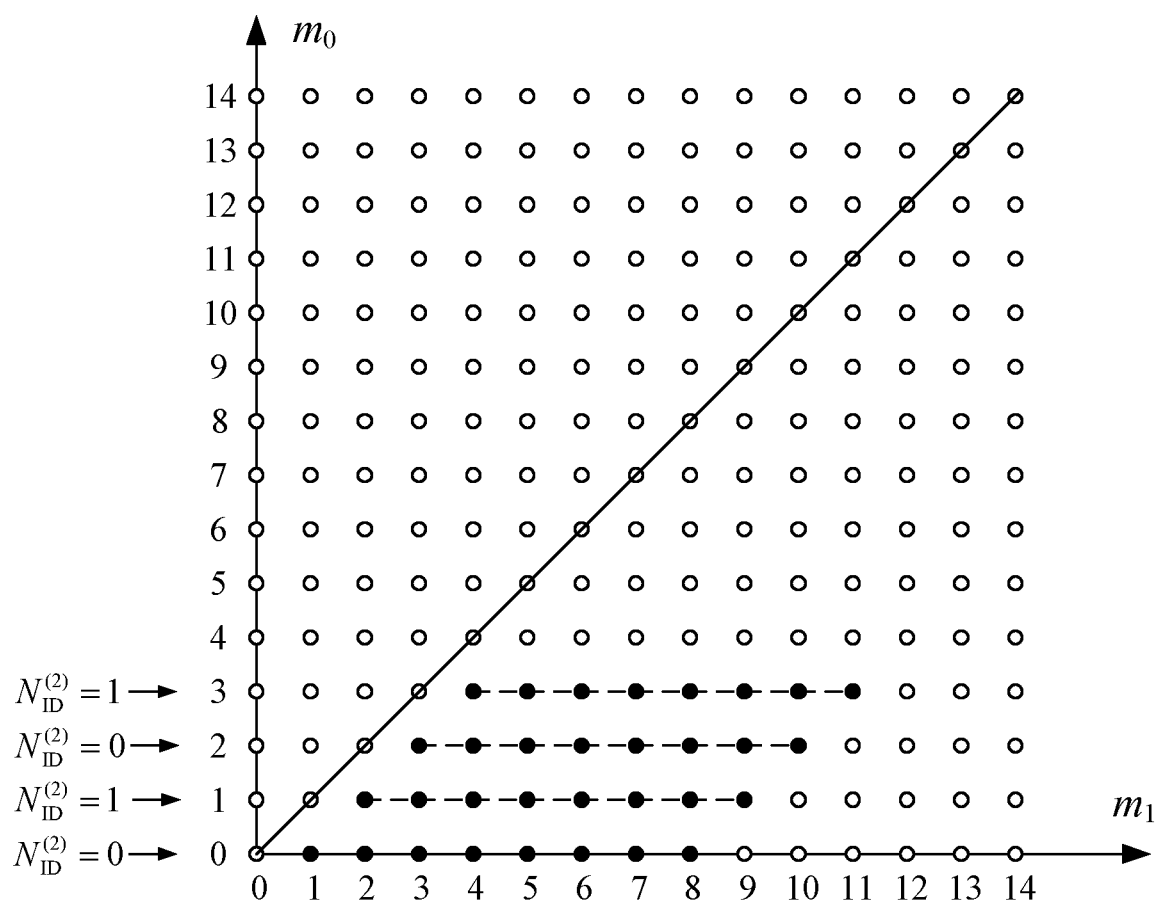
FIG. 13 shows another illustration of determined cyclic shifts according to an embodiment of the present invention.

As a non-limiting example, it may be mentioned that for a New Radio synchronization signal implementation, where L=127 and $N_{ID,max}^{(2)}$=3, this implementation for may be used, e.g., by letting $N_{ID,max}^{(1)}$=336 and L'=112, to carry 336×3=1008 cell IDs in total. A non-limiting illustration of such an implementation form is presented in FIG. 13 for $N_{ID,max}^{(1)}$=16, $N_{ID,max}^{(2)}$=2, L=15 and L'=8. In FIG. 13, the PSS sequence index $N_{ID}^{(2)}$ is on the y-axis, wherein $m_0$=0 and $m_0$=2 both have the same PSS sequence index $N_{ID}^{(2)}$=0, i.e. both $m_0$=0 and $m_0$=2 are associated with the same PSS sequence index $N_{ID}^{(2)}$=0. Correspondingly, both $m_0$=1 and $m_0$=3 are both are associated with the same PSS sequence index $N_{ID}^{(2)}$=1. It should be noted that the association of the PSS sequence index $N_{ID}^{(2)}$ to the first cyclic shift $m_0$, and the association of the SSS sequence index $N_{ID}^{(1)}$ to the first $m_0$ and second $m_1$ cyclic shifts, are not constrained to the order shown in FIG. 13. Instead, any other order is feasible as long as the cyclic shift pairs of any two SSS sequences associated to the same PSS index $N_{ID}^{(2)}$, e.g., $(m_0, m_1)$ and $(m'_0, m'_1)$, satisfy at most one of $m'_0=m_0+1$ and $m'_1=m_1+1$, and if the generated cyclic shift pairs always satisfy $m_0<m_1$ (or alternatively $m_0>m_1$).

In addition, a cell ID $N_{ID}$ may according to an embodiment be determined based on a first cyclic shift $m_0$ and a second cyclic shift $m_1$. This is possible as there exists a simple inverse mapping from the first $m_0$ and second $m_1$ cyclic shift values to the PSS $N_{ID}^{(2)}$ and SSS $N_{ID}^{(1)}$ sequence indices, which for example may be written as:

$$N_{ID}^{(1)} = m_1 + L'\left\lfloor\frac{m_0}{N_{ID,max}^{(2)}}\right\rfloor - m_0 - 1 \quad \text{(Eq. 24)}$$

$$N_{ID}^{(2)} = (m_0 \bmod N_{ID,max}^{(2)}); \quad \text{(Eq. 25)}$$

which is a limited/restricted version of the inverse mapping in equations (16) and (17) above, since g is here restricted to the value of one; g=1. This alleviates the need to implement large tables in the client device 500 for determining the cell ID from the first $m_0$ and second $m_1$ cyclic shift values.

As is described above, the first cyclic shift $m_0$ and the second cyclic shift $m_1$ associated with at least one cell ID $N_{ID}$ may be determined according a number of herein described embodiments, and will hereby have various relations to each other.

According to some herein described embodiments, e.g. illustrated in FIGS. 8, 10 and 12, the determination of the first $m_0$ and second $m_1$ cyclic shifts may be determined such that the first cyclic shift $m_0$ and the second cyclic shift $m_1$ are equal; $m_0=m_1$; i.e. such that there are usable positions on the diagonal through origin of coordinates.

According to some herein described embodiments, e.g. illustrated in FIGS. 9, 11 and 13, the determination of the first $m_0$ and second $m_1$ cyclic shifts may be determined such that the first cyclic shift $m_0$ and the second cyclic shift $m_1$ are different from each other; $m_0 \neq m_1$; such that there are no usable positions on the diagonal through origin of coordinates.

According to some herein described embodiments, the determination of the first $m_0$ and second $m_1$ cyclic shifts may be determined such that the first cyclic shift $m_0$ is larger than the second cyclic shift $m_1$; $m_0 > m_1$; i.e. there are only usable positions above the diagonal through origin of coordinates.

According to some herein described embodiments, e.g. illustrated in FIGS. 9, 11 and 13, the determination of the first $m_0$ and second $m_1$ cyclic shifts may be determined such that the first cyclic shift $m_0$ is smaller than the second cyclic shift $m_1$; $m_0 < m_1$; i.e. there are only usable positions below the diagonal through origin of coordinates.

According to some herein described embodiments, e.g. illustrated in FIGS. 8, 9, 10 and 11, the determination of the first $m_0$ and second $m_1$ cyclic shifts may be determined such that two cyclic shift pairs $(m_0, m_1)$ and $(m'_0, m'_1)$ satisfy at most one of $m'_0=m_0+1$ and $m'_1=m_1+1$; i.e. there is always unused positions between usable positions in the diagonal direction.

According to some herein described embodiments, the determination of the first $m_0$ and second $m_1$ cyclic shifts may be determined such that two cyclic shift pairs $(m_0, m_1)$ and $(m'_0, m'_1)$ satisfy at most one of $m'_0=m_0+1$ and $m'_1=m_1+1$; and the first cyclic shift $m_0$ is larger than the second cyclic shift $m_1$; $m_0 > m_1$; i.e. there is always unused positions between usable positions in the diagonal direction and there are only usable positions above the diagonal through origin of coordinates.

According to some herein described embodiments, e.g. illustrated in FIGS. 9 and 11, the determination of the first $m_0$ and second $m_1$ cyclic shifts may be determined such that two cyclic shift pairs $(m_0, m_1)$ and $(m'_0, m'_1)$ satisfy at most one of $m'_0=m_0+1$ and $m'_1=m_1+1$; and the first cyclic shift $m_0$ is smaller than the second cyclic shift $m_1$; $m_0 < m_1$; i.e. there is always unused positions between usable positions in the diagonal direction and there are only usable positions below the diagonal through origin of coordinates.

According to some herein described embodiments, e.g. illustrated in FIGS. 12 and 13, the determination of the first $m_0$ and second $m_1$ cyclic shifts may be determined such that two cyclic shift pairs $(m_0, m_1)$ and $(m'_0, m'_1)$ that satisfy both of $m'_0=m_0+1$ and $m'_1=m_1+1$ are associated with different primary synchronization signal PSS sequence indices $N_{ID}^{(2)}$.

According to some herein described embodiments, the determination of the first $m_0$ and second $m_1$ cyclic shifts may be determined such that two cyclic shift pairs $(m_0, m_1)$ and $(m'_0, m'_1)$ that satisfy both of $m'_0=m_0+1$ and $m'_1=m_1+1$ are associated with different primary synchronization signal PSS sequence indices $N_{ID}^{(2)}$, and the first cyclic shift $m_0$ is larger than the second cyclic shift $m_1$; $m_0 > m_1$; i.e. there are only usable positions above the diagonal through origin of coordinates.

According to some herein described embodiments, e.g. illustrated in FIG. 13, the determination of the first $m_0$ and second $m_1$ cyclic shifts may be determined such that two cyclic shift pairs $(m_0, m_1)$ and $(m'_0, m'_1)$ satisfy both of $m'_0=m_0+1$ and $m'_1=m_1+1$ are associated with different primary synchronization signal (PSS) sequence indices $N_{ID}^{(2)}$, and the first cyclic shift $m_0$ is smaller than the second cyclic shift $m_1$; $m_0 < m_1$; i.e. there are only usable positions below the diagonal through origin of coordinates.

Finally, it should be understood that the invention is not limited to the embodiments described above, but also relates to and incorporates all embodiments within the scope of the appended independent claims.

What is claimed is:

1. A network node, comprising:
    a transceiver; and
    a processing device coupled to the transceiver, the processing device being configured to generate a primary synchronization signal (PSS) sequence for a PSS and a secondary synchronization signal (SSS) sequence for an SSS,
        wherein the SSS sequence is associated with a first cyclic shift $m_0$ and a second cyclic shift $m_1$, and wherein $m_0$ and $m_1$ satisfy:

$$m_0 = g\left(N_{ID,max}^{(2)}\left\lfloor\frac{N_{ID}^{(1)}}{L'}\right\rfloor + N_{ID}^{(2)}\right);$$

$$m_1 = (N_{ID}^{(1)} \bmod L')$$

wherein:
      g is an integer equal to or larger than 1;
      L' is 112;
      $N_{ID}^{(1)} \in \{0, 1, 2, \ldots, N_{ID,max}^{(1)}-1\}$; and
      $N_{ID}^{(2)} \in \{0, 1, \ldots, N_{ID,max}^{(2)}-1\}$; and
   the transceiver being configured to transmit the PSS based on the PSS sequence and the SSS based on the SSS sequence.

2. The network node according to claim 1, wherein the PSS sequence is associated with $N_{ID}^{(2)}$.

3. The network node according to claim 1, wherein the first cyclic shift $m_0$ and the second cyclic shift $m_1$ are associated with a cell ID $N_{ID}$, wherein $N_{ID}=3 N_{ID}^{(1)}+N_{ID}^{(2)}$.

4. The network node according to claim 1, wherein the processing device is configured to generate the SSS sequence for the SSS based on a first sequence cyclically shifted by the first cyclic shift $m_0$ and a second sequence cyclically shifted by the second cyclic shift $m_1$, the first sequence and the second sequence having the same length.

5. The network node according to claim 4, wherein the first and the second sequences are m-sequences.

6. The network node according to claim 4, wherein a generator polynomial of the first sequence is $g_0(x)=x^7+x^4+1$, and a generator polynomial of the second sequence is $g_1(x)=x^7+x+1$.

7. The network node according to claim 4, wherein a generator polynomials of the PSS sequence is same with one of the generator polynomials of the first and the second sequences.

8. The network node according to claim 1, wherein the PSS sequence is one of three PSS sequences.

9. The network node according to claim 1, wherein the Length L of the SSS sequence is 127.

10. The network node according to claim 1, wherein $N_{ID,max}^{(2)}$ is 3, and $N_{ID}^{(2)} \in \{0, 1, 2\}$.

11. The network node according to claim 1, wherein $N_{ID,max}^{(1)}$ is 336, and $N_{ID}^{(1)} \in \{0, 1, 2, \ldots, 335\}$.

12. A processing device for wireless communications, comprising:
  at least one processor configured to:
  determine a first cyclic shift $m_0$ and a second cyclic shift $m_1$; and
  generate a secondary synchronization signal (SSS) sequence for an SSS,
  wherein the SSS sequence is associated with the first cyclic shift $m_0$ and the second cyclic shift $m_1$, and wherein $m_0$ and $m_1$ satisfy:

$$m_0 = g\left(N_{ID,max}^{(2)} \left\lfloor \frac{N_{ID}^{(1)}}{L'} \right\rfloor + N_{ID}^{(2)}\right);$$
$$m_1 = (N_{ID}^{(1)} \bmod L')$$

wherein:
  g is an integer equal to or larger than 1;
  L' is 112;
  $N_{ID}^{(1)} \in \{0, 1, 2, \ldots, N_{ID,max}^{(1)}-1\}$; and
  $N_{ID}^{(2)} \in \{0, 1, \ldots, N_{ID,max}^{(2)}-1\}$.

13. The processing device according to claim 12, wherein the at least one processor comprises at least one of the following defining operational logic:
  an application specific integrated circuitry (ASIC);
  a central processing unit (CPU) coupled to retrieve instructions from a memory, and processing logic that may interpret and execute instructions.

14. The processing device according to claim 12, wherein the at least one processor is configured to generate a primary synchronization signal (PSS) sequence for a PSS, the PSS sequence being associated with $N_{ID}^{(2)}$.

15. The processing device according to claim 12, wherein the first cyclic shift $m_0$ and the second cyclic shift $m_1$ are associated with a cell ID $N_{ID}$, wherein $N_{ID}=3\ N_{ID}^{(1)}+N_{ID}^{(2)}$.

16. The processing device according to claim 12, wherein the at least one processor is configured to generate the SSS sequence for the SSS based on a first sequence cyclically shifted by the first cyclic shift $m_0$ and a second sequence cyclically shifted by the second cyclic shift $m_1$, the first sequence and the second sequence having the same length.

17. The processing device according to claim 16, wherein the first and the second sequences are m-sequences.

18. The processing device according to claim 16, wherein a generator polynomial of the first sequence is $g_0(x)=x^7+x^4+1$, and a generator polynomial of the second sequence is $g_1(x)=x^7+x+1$.

19. The processing device according to claim 16, wherein a generator polynomials of the PSS sequence is same with one of the generator polynomials of the first and the second sequences.

20. The processing device according to claim 12, wherein the Length L of the SSS sequence is 127.

21. The processing device according to claim 12, wherein $N_{ID,max}^{(2)}$ is 3, and $N_{ID}^{(2)} \in \{0, 1, 2\}$.

22. The processing device according to claim 12, wherein $N_{ID,max}^{(1)}$ is 336, and $N_{ID}^{(1)} \in \{0, 1, 2, \ldots, 335\}$.

23. A non-transitory computer readable medium, comprising computer instructions that, when executed by a processor, cause the processor to
  determine a first cyclic shift $m_0$ and a second cyclic shift $m_1$; and
  generate a secondary synchronization signal (SSS) sequence for an SSS,
  wherein the SSS sequence is associated with the first cyclic shift $m_0$ and the second cyclic shift $m_1$, and wherein $m_0$ and $m_1$ satisfy:

$$m_0 = g\left(N_{ID,max}^{(2)} \left\lfloor \frac{N_{ID}^{(1)}}{L'} \right\rfloor + N_{ID}^{(2)}\right);$$
$$m_1 = (N_{ID}^{(1)} \bmod L')$$

wherein:
  g is an integer equal to or larger than 1;
  L' is 112;
  $N_{ID}^{(1)} \in \{0, 1, 2, \ldots, N_{ID,max}^{(1)}-1\}$; and
  $N_{ID}^{(2)} \in \{0, 1, \ldots, N_{ID,max}^{(2)}-1\}$.

24. The non-transitory computer readable medium according to claim 23, further comprising computer instructions for causing the processor to generate the SSS sequence formed with a first sequence corresponding to the first cyclic shift $m_0$ and a second sequence corresponding to the second cyclic shift $m_1$.

25. The non-transitory computer readable medium according to claim 24, wherein a generator polynomial of the first sequence is $g_0(x)=x^7+x^4+1$, and a generator polynomial of the second sequence is $g_1(x)=x^7+x+1$.

26. The non-transitory computer readable medium according to claim 24, further comprising computer instructions for causing the processor to generate a primary synchronization signal (PSS) sequence, wherein a generator polynomials of the PSS sequence is same with one of the generator polynomials of the first and the second sequences.

27. The non-transitory computer readable medium according to claim 24, wherein the first cyclic shift $m_0$ and the second cyclic shift $m_1$ are associated with a cell ID $N_{ID}$, wherein $N_{ID}=3\ N_{ID}^{(1)}+N_{ID}^{(2)}$.

28. The non-transitory computer readable medium according to claim 25, wherein $N_{ID,max}^{(2)}$ is 3, and $N_{ID}^{(2)} \in \{0, 1, 2\}$.

29. The non-transitory computer readable medium according to claim 25, wherein $N_{ID,max}^{(1)}$ is 336, and $N_{ID}^{(1)} \in \{0, 1, 2, \ldots, 335\}$.

30. The non-transitory computer readable medium according to claim 25, wherein an SSS sequence for the SSS has a length L of 127.

* * * * *